(12) United States Patent
Fukumoto et al.

(10) Patent No.: US 11,934,589 B2
(45) Date of Patent: Mar. 19, 2024

(54) CONFIGURING A MOUSE DEVICE THROUGH PRESSURE DETECTION

(71) Applicant: Microsoft Technology Licensing, LLC, Redmond, WA (US)

(72) Inventors: Masaaki Fukumoto, Beijing (CN); Hao Zhuang, Redmond, WA (US); Jianjun Ju, Redmond, WA (US); Paul Kos, Shenzhen (CN); Nicolas Schmitt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/641,803

(22) PCT Filed: Oct. 10, 2019

(86) PCT No.: PCT/CN2019/110281
§ 371 (c)(1),
(2) Date: Mar. 9, 2022

(87) PCT Pub. No.: WO2021/068147
PCT Pub. Date: Apr. 15, 2021

(65) Prior Publication Data
US 2023/0168751 A1    Jun. 1, 2023

(51) Int. Cl.
*G06F 3/0354* (2013.01)
*G01L 5/00* (2006.01)
(Continued)

(52) U.S. Cl.
CPC ........ *G06F 3/03543* (2013.01); *G01L 5/0038* (2013.01); *G06F 3/0346* (2013.01); *G06F 3/0383* (2013.01)

(58) Field of Classification Search
CPC ................. G06F 3/03543; G01L 5/0038
See application file for complete search history.

(56) References Cited

U.S. PATENT DOCUMENTS

| 5,260,696 A | 11/1993 | Maynard, Jr. |
| 6,515,651 B1 | 2/2003 | Berstis |
(Continued)

FOREIGN PATENT DOCUMENTS

| CN | 106383599 A | 2/2017 |
| CN | 108829278 A | 11/2018 |
| CN | 109725746 A | 5/2019 |

OTHER PUBLICATIONS

Cechanowicz, et al., "Augmenting the Mouse with Pressure Sensitive Input", In Proceedings of the SIGCHI Conference on Human factors in Computing Systems, Apr. 28, 2007, pp. 1385-1394.
(Continued)

*Primary Examiner* — Chun-Nan Lin
(74) *Attorney, Agent, or Firm* — Schwegman Lundberg & Woessner, P.A.

(57) ABSTRACT

A method and apparatus for configuring a mouse device (102) through pressure detection, and further proposes a corresponding mouse device (102). Pressure detected between the mouse device (102) and an operation surface (104) may be obtained. An operating state corresponding to the pressure may be determined. The mouse device (102) may be configured to the operating state.

11 Claims, 16 Drawing Sheets

(51) Int. Cl.
*G06F 3/0346* (2013.01)
*G06F 3/038* (2013.01)

(56) References Cited

U.S. PATENT DOCUMENTS

| | | |
|---|---|---|
| 7,106,313 B2 | 9/2006 | Schena et al. |
| 7,394,454 B2 | 7/2008 | Kong |
| 8,581,957 B2 | 11/2013 | Bengtsson et al. |
| 9,304,587 B2 | 4/2016 | Wright et al. |
| 9,589,357 B2 | 3/2017 | Li et al. |
| 10,365,758 B1 | 7/2019 | Smith |
| 2006/0164393 A1 | 7/2006 | Wu et al. |
| 2009/0135140 A1 | 5/2009 | Constantin et al. |
| 2009/0160774 A1 | 6/2009 | Lee et al. |
| 2010/0045604 A1 | 2/2010 | Kim |
| 2012/0316797 A1* | 12/2012 | Ratzlaff ............... A01K 29/005 702/41 |
| 2016/0132139 A1 | 5/2016 | Du et al. |
| 2019/0087023 A1 | 3/2019 | Zhao |
| 2019/0171302 A1* | 6/2019 | Su ........................... G06F 3/016 |
| 2020/0310561 A1* | 10/2020 | Connellan ........... G06F 3/03545 |
| 2020/0341565 A1* | 10/2020 | Chen .................. G06F 3/03543 |

OTHER PUBLICATIONS

"International Search Report and Written Opinion Issued in PCT Application No. PCT/CN19/110281", dated Jul. 13, 2020, 10 Pages.
"Extended Search Report issued in European Patent Application No. 19948761.2", dated May 8, 2023, 9 Pages.
"Office Action and Search Report Issued in Chinese Patent Application No. 201980079652.X", dated Jul. 19, 2023, 16 Pages.

* cited by examiner

CONFIGURING A MOUSE DEVICE THROUGH PRESSURE DETECTION

CROSS-REFERENCE TO RELATED APPLICATIONS

This application is a U.S. National Stage Filing under 35 U.S.C. 371 of International Patent Application Serial No. PCT/CN19/110281, filed Oct. 10, 2019, which application is incorporated herein by reference in their entirety.

BACKGROUND

A mouse device is a hand-held pointing device that detects two-dimensional motion relative to a surface. This motion is typically translated into a motion of a cursor on a computer display, which allows a smooth control of a graphical user interface. In recent years, some advanced mouse devices have been designed and manufactured to meet different requirements. For example, many mouse manufacturers have launched gaming mice designed for computer games. They typically employ a wide array of controls and buttons and have designs that differ radically from traditional mouse devices.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for configuring a mouse device through pressure detection, and further propose a corresponding mouse device. Pressure detected between the mouse device and an operation surface may be obtained. An operating state corresponding to the pressure may be determined. The mouse device may be configured to the operating state.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
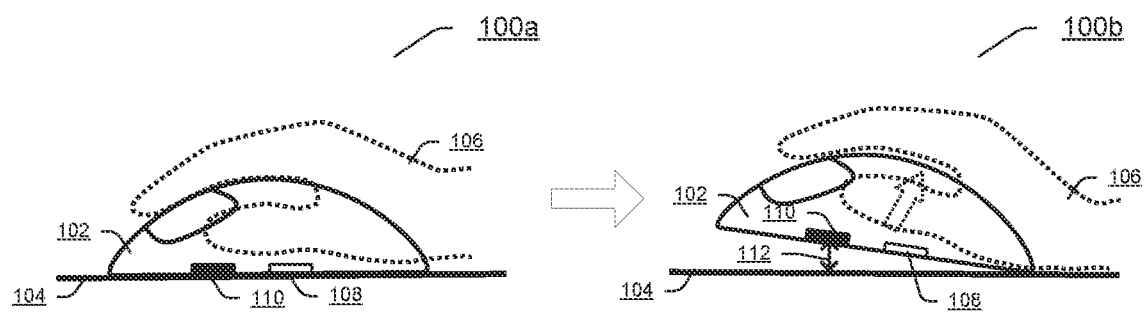
FIG. 1 illustrates an exemplary lift-off operation detection of a traditional mouse device.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A mouse device may enter into a hover state if it is lifted off from an operation surface on which it is operating. In the hover state, an optical sensor of the mouse device may be disabled and stop reporting the movement of the mouse device to a host computer communicated with the mouse device. A traditional mouse device typically employs a distance sensor located on the bottom of the mouse device to detect the hover state. More particular, the distance sensor may measure a distance between the distance sensor and an operation surface, and an optical sensor of the mouse device will be disabled if the distance achieves a predetermined threshold. The predetermined threshold is often referred to as Lift-Off-Distance (LOD) or clutch distance. Smaller LOD can realize faster detection of the hover state. However, each distance sensor requires a certain minimum working distance. Currently, the minimum LOD that can be achieved may be 0.5 mm. That is, the hover state cannot be detected until the measured distance reaches 0.5 mm, which is not desirable especially when repeated hovering actions for repositioning are performed by a user.

Sensitivity is another parameter of the mouse device, which is usually measured in terms of Counts Per Inch (CPI), commonly expressed as Dots Per Inch (DPI). CPI is used to refer to the number of steps the mouse device will report when it is moved by one inch. DPI is used to refer to the number of dots of cursor motion when the mouse device is moved by one inch. If a default mouse-tracking condition involves moving the cursor by one pixel or dot on the screen per reported step, then the CPI is equal to DPI. High sensitivity can increase a speed of the cursor of the mouse device, however, it may have side effect in some scenarios where precise targeting is required, such as aiming at targets in shooting games or drawing precision images in drawing applications. Some mouse devices have been disposed thereon sensitivity change buttons, such as CPI change buttons, for changing their sensitivities. Moreover, sensitivity of some other mouse devices may be changed through clicking certain buttons on a keyboard or modifying sensitivity settings with a software module in the host computer. However, these ways of changing the sensitivity of the mouse devices are not intuitive.

Embodiments of the present disclosure propose a mouse device equipped with at least one pressure sensor. The at least one pressure sensor may be located at the bottom of the mouse device and used for detecting pressure between the mouse device and an operation surface. The detected pressure may be used for determining an operating state of the mouse device. For example, the operating state may comprise a hover state or a non-hover state. The operating state may be determined as the hover state if the detected pressure is less than a threshold, or as the non-hover state if the detected pressure is not less than the threshold. In this way, the hover state can be detected before the mouse device is really lifted off, thus achieving zero LOD. The operating state may further comprise a sensitivity configuration state, the sensitivity configuration state having a corresponding sensitivity. The sensitivity configuration state may be changed if the detected pressure is equal to or greater than a threshold or falls into a certain pressure range among different pressure ranges. Compared with the conventional ways of changing the sensitivity configuration state, the way of changing the sensitivity configuration state through the pressure detection between the mouse device and the operation surface is more intuitive.

FIG. 1 illustrates an exemplary lift-off operation detection of a traditional mouse device. In diagram 100a, a mouse device 102 may be placed on an operation surface 104, such as a table or a mousepad. A user's hand 106 may hold the mouse device 102 and move it on the operation surface 104. At this point, an operating state of the mouse device 102 may be a non-hover state, during which an optical sensor 108 located at the bottom of the mouse device 102 can detect the movement of the mouse device 102 which is reported to a host computer (not shown) communicated with the mouse device 102. The mouse device 102 may also have a distance sensor 110 at the bottom for measuring its distance from the operation surface 104.

Diagram 100b illustrates a scene in which the mouse device 102 is lifted off. In diagram 100b, the head part of the mouse device 102 is raised up by the hand 106, and there is a distance 112 between the distance sensor 110 and the operation surface 104, which can be measured by the distance sensor 110. It should be appreciated that the hand 106 may also raise the entire mouse device 102 up, and the distance 112 can also be measured by the distance sensor 110. When the distance 112 achieves a threshold, the operating state of the mouse device 102 can be determined as the hover state. In the hover state, the optical sensor 108 may be disabled, and the mouse device 102 may stop reporting any movement to the host computer.

Figure 2:
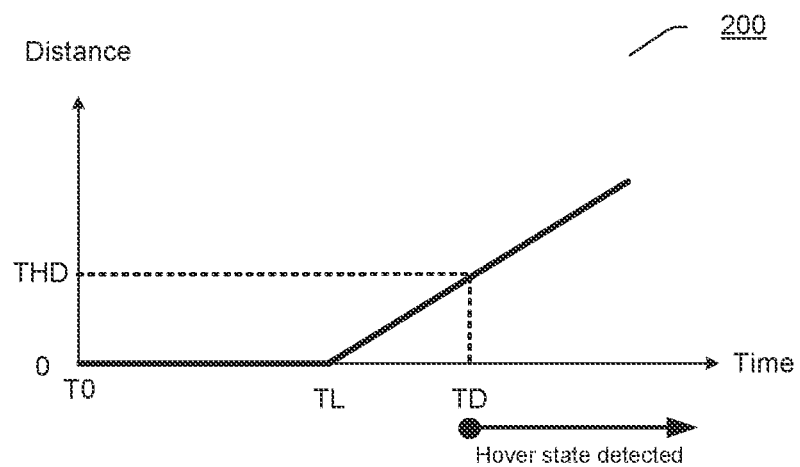
FIG. 2 illustrates an exemplary curve graph of lift-off operation detection of a traditional mouse device.

FIG. 2 illustrates an exemplary curve graph 200 of lift-off operation detection of a traditional mouse device, such as the mouse device 102 in FIG. 1. In the curve graph 200, the x axis indicates time, and the y axis indicates distance between a distance sensor of the mouse device and an operation surface, such as the distance 112 in FIG. 1.

At the time T0, a user's hand starts to raise the mouse device up, and the mouse device is going to be lifted off from the operation surface. At the time TL, the mouse device is lifted off from the operation surface and the distance between the distance sensor and the operation surface starts to increase from zero. From the time T0 to the time TL, the mouse device is still on the operation surface, and the operating state of the mouse device may be the non-hover state. From the time TL to the time TD, the mouse device leaves the operation surface but is still in the non-hover state.

When the distance reaches a predetermined threshold THD at the time TD, the operating state of the mouse device can be determined as the hover state. The threshold THD may be referred to as LOD or clutch distance. From the time TD, the mouse device may be kept in the hover state. It can be seen from FIG. 2 that a smaller LOD can realize faster detection of the hover state. However, since each distance sensor requires a certain minimum working distance, the LOD cannot be reduced arbitrarily, e.g., the LOD cannot be set below the minimum working distance of the distance sensor.

To achieve a faster detection of the hover state, the embodiments of the present disclosure propose to determine an operating state of a mouse device based on pressure. FIG.

3 illustrates an exemplary lift-off operation detection of a mouse device according to an embodiment of the present disclosure.

In diagram 300a, a mouse device 302 may be placed on an operation surface 304, such as a table or a mousepad. A user's hand 306 may hold the mouse device 102 and intend to raise it up from the operation surface 304. The mouse device 302 may have an optical sensor 308 for detecting the movement of the mouse device 302 which is reported to a host computer (not shown) communicated with the mouse device 302. The mouse device 302 may also have a pressure sensor 310 at the bottom for detecting pressure between the mouse device 302 and the operation surface 304, e.g., pressure between the pressure sensor 310 and the operation surface 304.

Diagram 300b illustrates a bottom view of the mouse device 302. As an example, the optical sensor 308 may be located in the center at the bottom of the mouse device 302, and the pressure sensor 310 may be located at the head part of the bottom of the mouse device 302. It should be appreciated that the pressure sensor 310 may be located at any other part of the bottom.

Initially, the operating state of the mouse device 302 may be the non-hover state. When the pressure between the mouse device 302 and the operation surface 304 is less than a predetermined threshold, the operating state may be changed to the hover state.

Figure 4:
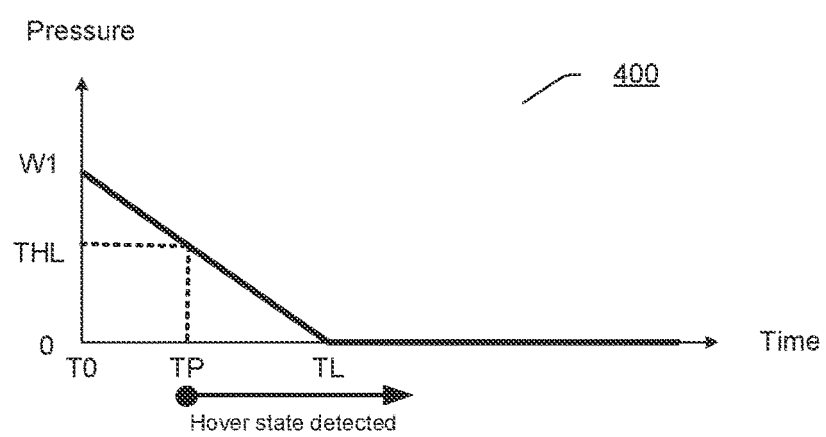
FIG. 4 illustrates an exemplary curve graph of lift-off operation detection of a mouse device according to an embodiment of the present disclosure.

FIG. 4 illustrates an exemplary curve graph 400 of lift-off operation detection of a mouse device according to an embodiment of the present disclosure. In the curve graph 400, the x axis indicates time, and the y axis indicates pressure between the mouse device and an operation surface.

At the time T0, a user's hand starts to raise the mouse device up, and the mouse device is going to be lifted off from the operation surface, thereby the pressure between the mouse device and the operation surface starts to decrease. The initial pressure between the mouse device and the operation surface may be equal to or higher than the mouse device's weight W1, and the initial operating state of the mouse device may be the non-hover state. At the time TP, the pressure decreases to a predetermined lift-off threshold THL. At this point, the operating state of the mouse device can be determined as the hover state. That is, the mouse device may enter into the hover state at the time TP. Herein, the lift-off threshold THL may be referred to as a threshold for determining the hover state of the mouse device based on the pressure. The pressure may continue to decrease to zero at the time TL when the mouse device leaves the operation surface.

In FIG. 4, the hover state can be detected at the time TP, which is before the time TL at which the mouse device leaves the operation surface. In other words, the hover state can be detected before the mouse device really leaves the operation surface, thus achieving zero LOD. Referring back to FIG. 2, the hover state is detected at the time TD which is after the time TL at which the mouse device really leaves the operation surface. Thus, compared with the way of detecting the hover state through the distance in FIG. 2, the way of detecting the hover state through the pressure in FIG. 4 according to the embodiment of the present disclosure can shorten the time for detecting the hover state, thereby increasing a switch speed between the hover state and the non-hover state.

The lift-off threshold THL may be less than the mouse device's weight W1. Higher lift-off threshold THL can realize faster detection of the hover state, but may lead to false detection. For example, due to rough handling of the mouse device or rough surface condition, the pressure detected by the pressure sensor may fluctuate. If the lift-off threshold THL is set too high, the pressure produced by a mouse device that moves normally on the operation surface may be easily less than the lift-off threshold THL. The mouse device might be wrongly detected as being in the hover state. Thus, there should be a trade-off between efficiency and accuracy. For example, if the mouse device's weight W1 is 40 g, the lift-off threshold THL may be between 10 g and 30 g.

Figure 5:
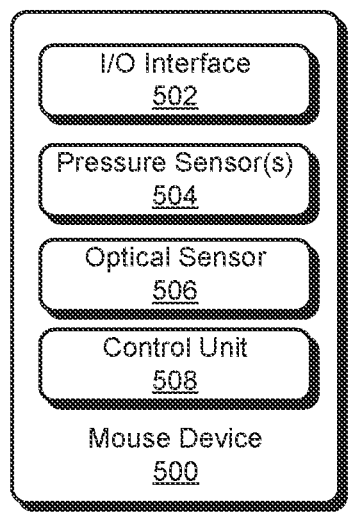
FIG. 5 illustrates an exemplary mouse device according to an embodiment of the present disclosure.

FIG. 5 illustrates an exemplary mouse device 500 according to an embodiment of the present disclosure.

The mouse device 500 may comprise an Input/Output (I/O) interface 502, at least one pressure sensor 504, an optical sensor 506 and a control unit 508. The I/O interface 502 may be configured to communicate with a host computer (not shown), such as sending data obtained from the at least one pressure sensor 504 or the optical sensor 506 to the host computer, receiving setting commands from the host computer, and the like. The at least one pressure sensor 504 may be configured to detect at least one pressure between the mouse device 500 and an operation surface. The optical sensor 506 can be configured to detect movement of the mouse device 500 which is further reported by the I/O interface 502 to the host computer. The control unit 508 may be configured to obtain the at least one pressure detected by the at least one pressure sensor 504, determine an operation state corresponding to the at least one pressure, and configure the mouse device 500 to the operation state.

It should be appreciated that the mouse device 500 illustrated in FIG. 5 is merely one example. Depending on the actual application requirements, the mouse device 500 may have any other structure and may include more or fewer elements. Moreover, some functions implemented by the control unit 500 may also be implemented by the host computer.

Figure 6:
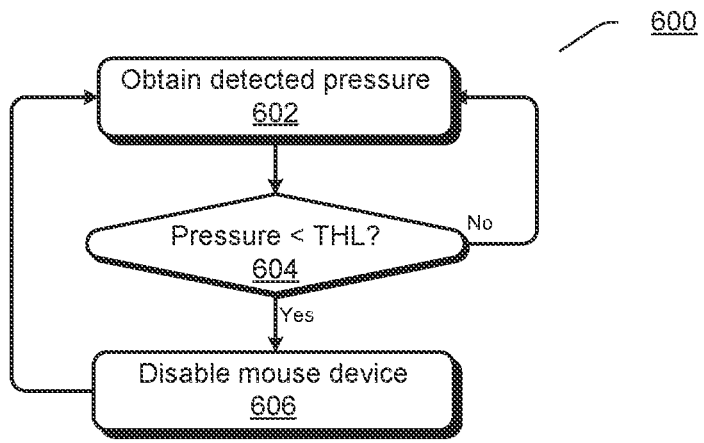
FIG. 6 illustrates an exemplary process of configuring a mouse device based on pressure according to an embodiment of the present disclosure.

FIG. 6 illustrates an exemplary process 600 of configuring a mouse device based on pressure according to an embodiment of the present disclosure. This process may be executed by a control unit in the mouse device, such as the control unit 508 in FIG. 5.

At 602, the control unit may obtain pressure between the mouse device and an operation surface. The pressure may be detected by a pressure sensor in the mouse device, such as the pressure sensor 504 in FIG. 5.

At 604, the pressure may be compared with a state change criterion. In an embodiment, the state change criterion may include a lift-off threshold THL. For example, it may be determined whether the pressure is less than a lift-off threshold THL. The lift-off threshold THL may correspond to the lift-off threshold THL in FIG. 4.

If it is determined at 604 that the pressure is less than the lift-off threshold THL, the mouse device may be disabled at 606. For example, an optical sensor of the mouse device, such as the optical sensor 506 in FIG. 5, may be disabled, and no movement of the mouse device will be reported to a host computer communicated with the mouse device.

If it is determined at 604 that the pressure is equal to or greater than the lift-off threshold THL, the process 600 may return to the step 602.

Figure 3:
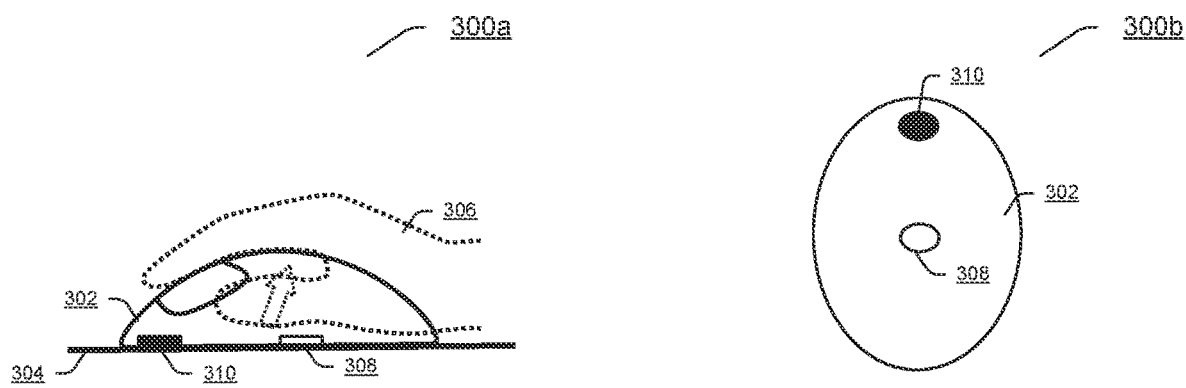
FIG. 3 illustrates an exemplary lift-off operation detection of a mouse device according to an embodiment of the present disclosure.
Figure 7:
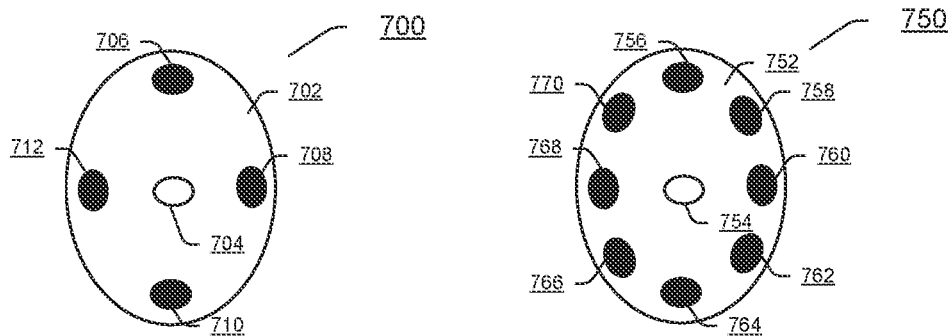
FIG. 7 illustrates exemplary bottom views of mouse devices according to an embodiment of the present disclosure, each of the mouse devices having a plurality of pressure sensors.

It should be appreciated that although in FIG. 3 there is only one pressure sensor in the mouse device 302 and the pressure sensor is located at the head part of the bottom of the mouse device 302, there may be more than one pressure sensors in the mouse device 302 and these pressure sensors may be located at any parts of the bottom of the mouse device 302. FIG. 7 illustrates exemplary bottom views 700 and 750 of mouse devices according to an embodiment of the present disclosure, each of the mouse devices having a plurality of pressure sensors.

In diagram 700, there are an optical sensor 704 and four pressure sensors 706, 708, 710 and 712 at the bottom of a mouse device 702. The four pressure sensors 706, 708, 710 and 712 may be located at the head, right, tail and left parts of the bottom of the mouse device 702, respectively.

In diagram 750, there are an optical sensor 754 and eight pressure sensors 756, 758, 760, 762, 764, 766, 768 and 770 at the bottom of a mouse device 752. The eight pressure sensors 756, 758, 760, 762, 764, 766, 768 and 770 may be evenly distributed at the edge of the bottom of the mouse device 752.

When there is a plurality of pressure sensors at the bottom of a mouse device, each of the plurality of pressure sensors may detect pressure between the mouse device and an operation surface. A respective lift-off threshold THL can be set for each pressure sensor. For example, a lift-off threshold THL set for the pressure sensor 706 at the head part may be different from, and preferably greater than, that set for the pressure sensor 710 at the tail part, since the head part is usually lifted off before the tail part. The mouse device can be disabled when any pressure detected by the pressure sensors is less than its respective lift-off threshold THL.

It should be appreciated that FIG. 7 is merely exemplary. Depending on the actual application requirements, a mouse device may have any other number of pressure sensors and these pressure sensors may be located at any other parts of the bottom of the mouse device.

Figure 8:
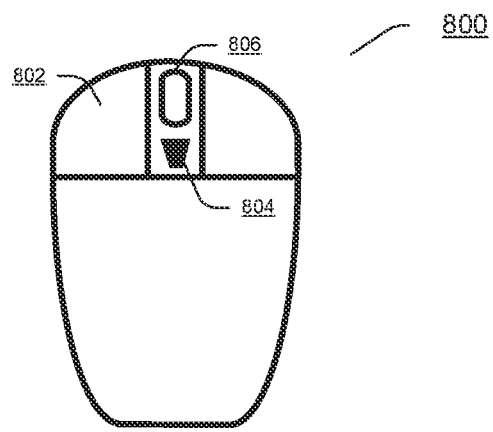
FIG. 8 illustrates an exemplary top view of a traditional mouse device.

In some scenarios, it may be desired to change sensitivity configuration state of a mouse device, e.g., changing sensitivity of the mouse device to a higher or lower level. For example, in a scenario where precise targeting is required, such as aiming at targets in shooting games or drawing precision images in drawing applications, a user may desire to change the sensitivity of the mouse device to a lower level. Herein, the sensitivity configuration state is also a type of operating state of the mouse device. Some mouse devices have been disposed thereon sensitivity change buttons, such as CPI change buttons, for changing their sensitivities. FIG. 8 illustrates an exemplary top view 800 of a traditional mouse device 802. As shown, a CPI change button 804 may be located on the top of the mouse device 802 and adjacent to a wheel 806. The CPI change button 804 may be used for making a selection among several sensitivity levels, such as low CPI, medium CPI, high CPI, and the like. For example, through clicking on the CPI change button 804 in turn, the mouse device 802 may be switched among different sensitivity configuration states.

Moreover, if available, the sensitivity may be changed through clicking certain buttons on a keyboard or modifying sensitivity settings with a software module in a host computer communicated with the mouse device. However, all these ways of changing the sensitivity are not very intuitive.

Figure 9:
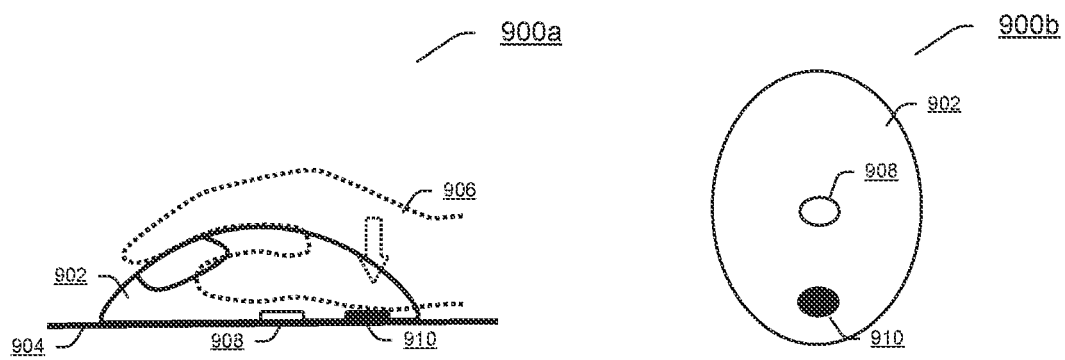
FIG. 9 illustrates an exemplary pressing operation detection of a mouse device according to an embodiment of the present disclosure.

In order to change the sensitivity of a mouse device in a more intuitive way, the embodiments of the present disclosure propose to adjust sensitivity configuration state of a mouse device based on pressure. FIG. 9 illustrates an exemplary pressing operation detection of a mouse device according to an embodiment of the present disclosure.

In diagram 900a, a mouse device 902 may be placed on an operation surface 904. A user's hand 906 may hold the mouse device 902 and move it on the operation surface 904. The mouse device 902 may comprise an optical sensor 908 for detecting the movement of the mouse device 902 which is reported to a host computer (not shown) communicated with the mouse device 902. The mouse device 902 may also comprise a pressure sensor 910 for detecting pressure between the mouse device 902 and the operation surface 904, e.g., pressure between the pressure sensor 910 and the operation surface 904.

When the user intends to change the sensitivity configuration state of the mouse device, such as when the user is aiming at a target in a shooting game or drawing a precision image in a drawing application, the user may press the body of the mouse device 902, and thus resulting in a force applied to the mouse device in a direction toward the operation surface 904. The pressure detected by the pressure sensor 910 may increase accordingly. When the pressure reaches a predetermined threshold, the sensitivity configuration state of the mouse device may be changed.

Diagram 900b illustrates a bottom view of the mouse device 902. As an example, the optical sensor 908 may be located in the center of the bottom of the mouse device 902, and the pressure sensor 910 may be located at the tail part of the bottom of the mouse device 902. It should be appreciated that the pressure sensor 910 may be located at any other part of the bottom.

It should be appreciated that although in FIG. 9 there is only one pressure sensor in the mouse device 902 and the pressure sensor is located at the tail part of the bottom of the mouse device 902, there may be more than one pressure sensors in the mouse device 902 and these pressure sensors may be located at any other parts of the bottom of the mouse device 902. Moreover, the mouse device 902 may have a structure similar with that of the mouse device 500, except that the control unit may be configured for adjusting sensitivity of the mouse device based on pressure.

Figure 10:
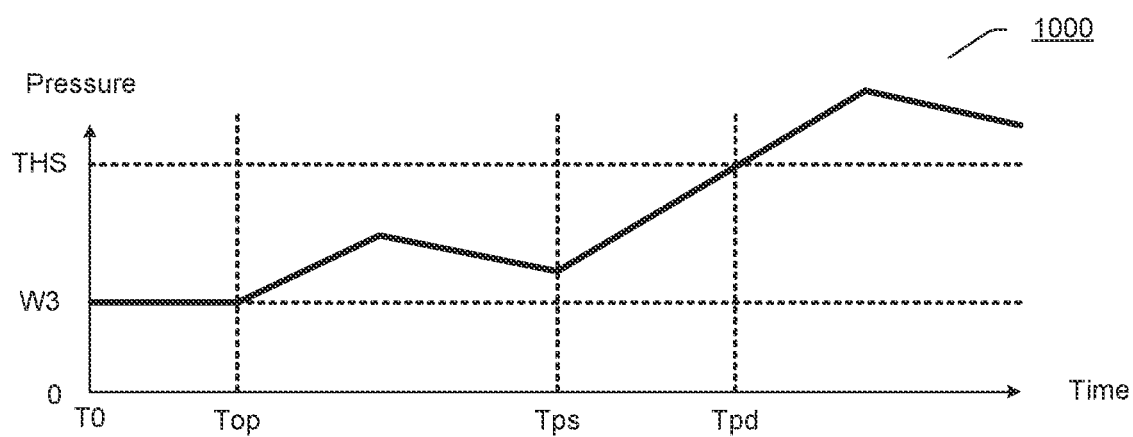
FIG. 10 illustrates an exemplary curve graph of pressing operation detection according to an embodiment of the present disclosure.

FIG. 10 illustrates an exemplary curve graph 1000 of pressing operation detection according to an embodiment of the present disclosure. The curve graph 1000 may correspond to a scene in which a user intends to change the sensitivity configuration state of a mouse device, such as using the mouse device to aim at a target in a shooting game or draw a precision image in a drawing application. In the curve graph 1000, the x axis indicates time, and the y axis indicates pressure between the mouse device and an operation surface. The pressure may be detected by a pressure sensor of the mouse device, such as the pressure sensor 910 in FIG. 9.

From the time T0 to the time Top, the user's hand is not put on the mouse device, and the pressure may be stable at the mouse device's weight W3. At the time Top, the user puts his hand on the mouse device, and the pressure starts to increase because an additional pressure caused by the hand is added to the mouse device's weight W3. The pressure may fluctuate due to the operation surface condition, an unstable holding of the mouse device, etc. At the time Tps, the user intentionally presses the mouse device, and the pressure continues to increase. When the pressure reaches a predetermined sensitivity change threshold THS at the time Tpd, the operating state of the mouse device, such as sensitivity configuration state, can be changed, and accordingly the sensitivity of the mouse device can be changed. Herein, the sensitivity change threshold THS may be referred as a threshold for determining the sensitivity configuration state of the mouse device based on pressure.

According to the embodiment of the present disclosure, the sensitivity configuration state of the mouse device can be changed based on pressure between the mouse device and the operation surface, which is related to the force the user applied on the mouse device. Thus, such a way of changing the sensitivity configuration state may be more intuitive compared with the way of changing the sensitivity configuration state through clicking buttons or modifying system settings.

The sensitivity change threshold THS may be greater than the mouse device's weight W3. In an implementation, in order to avoid unexpected sensitivity change, the sensitivity change threshold THS may be above a normal pressure range for normally operating the mouse device on the operation surface.

Figure 11:
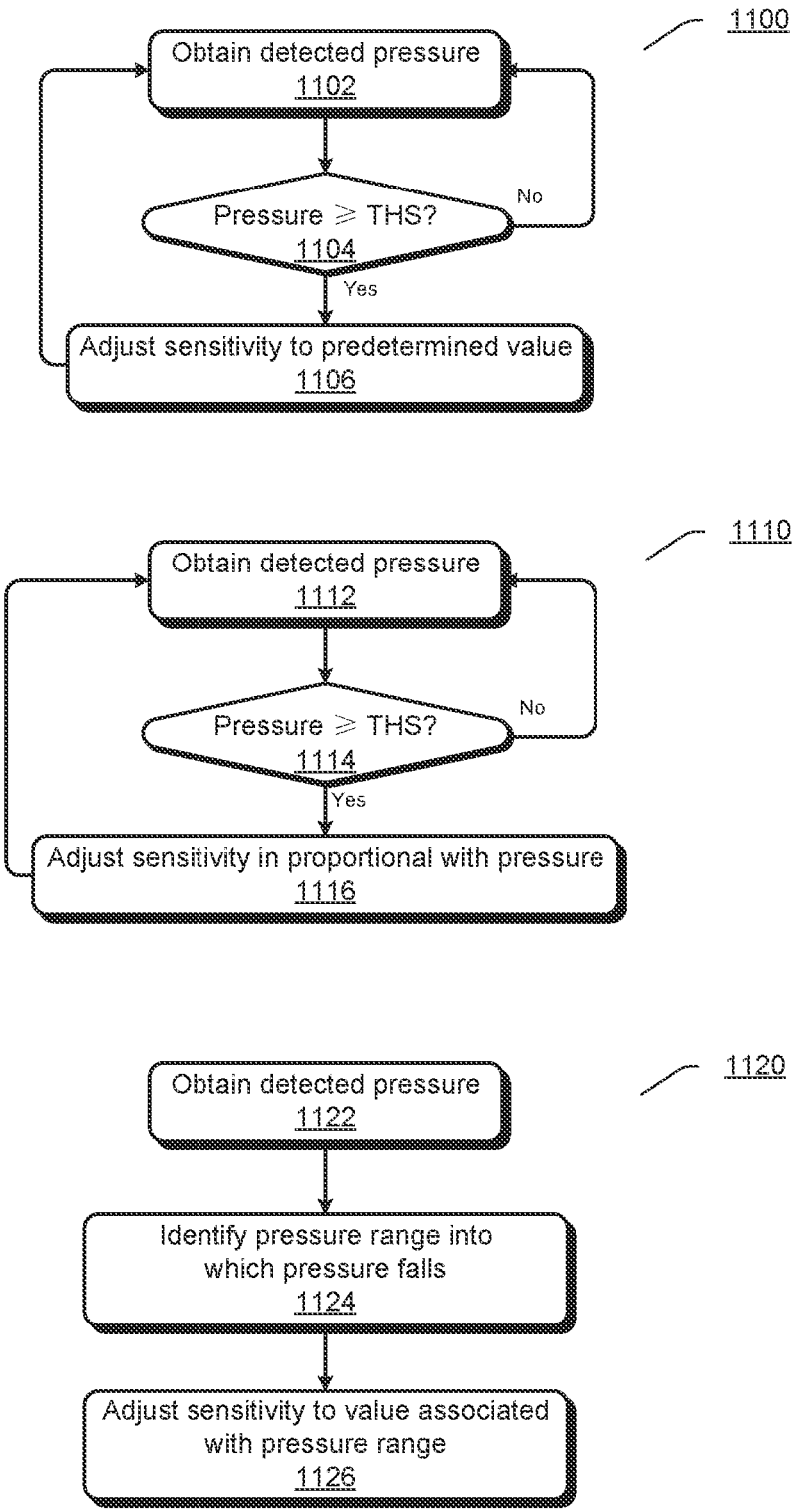
FIG. 11 illustrates exemplary processes of adjusting a sensitivity configuration state of a mouse device based on pressure according to embodiments of the present disclosure.

FIG. 11 illustrates exemplary processes 1100, 1110 and 1120 of adjusting a sensitivity configuration state of a mouse device based on pressure according to embodiments of the present disclosure. The processes 1100, 1110 and 1120 may be executed by a control unit in the mouse device.

In the process 1100, at 1102, the control unit may obtain pressure between the mouse device and an operation surface. The pressure may be detected by a pressure sensor in the mouse device, such as the pressure sensor 910 in FIG. 9.

At 1104, the pressure may be compared with a state change criterion. In an embodiment, the state change criterion may include a sensitivity change threshold THS. For example, it may be determined whether the pressure is equal to or greater than the sensitivity change threshold THS. The sensitivity change threshold THS may correspond to the sensitivity change threshold THS in FIG. 10.

If it is determined at 1104 that the pressure is equal to or greater than the sensitivity change threshold THS, the sensitivity configuration state of the mouse device may be adjusted to a predetermined configuration state, e.g., the sensitivity of the mouse device may be adjusted to a predetermined value at 1006.

If it is determined at 1104 that the pressure is less than the sensitivity change threshold THS, the process 1100 may return to the step 1102.

In the process 1110, at 1112, the control unit may obtain pressure between the mouse device and an operation surface. The pressure may be detected by a pressure sensor in the mouse device, such as the pressure sensor 910 in FIG. 9.

At 1114, the pressure may be compared with a state change criterion. In an embodiment, the state change criterion may include a sensitivity change threshold THS. For example, it may be determined whether the pressure is equal to or greater than the sensitivity change threshold THS. The sensitivity change threshold THS may correspond to the sensitivity change threshold THS in FIG. 9.

If it is determined at 1114 that the pressure is equal to or greater than the sensitivity change threshold THS, the sensitivity configuration state of the mouse device may be adjusted in a predetermined way. For example, the sensitivity of the mouse device may be adjusted in proportional with the pressure at 1116, e.g., being adjusted linearly or nonlinearly with the pressure.

If it is determined at 1114 that the pressure is less than the sensitivity change threshold THS, the process 1100 may return to the step 1112.

In the process 1120, at 1122, the control unit may obtain pressure between the mouse device and an operation surface. The pressure may be detected by a pressure sensor in the mouse device, such as the pressure sensor 910 in FIG. 9.

At 1124, the control unit may compare the pressure with a state change criterion. In an embodiment, the state change criterion may include a number of pressure ranges and respective sensitivities. The control unit may identify a pressure range into which the pressure falls through comparing the pressure with the number of pressure ranges. For example, a plurality of pressure ranges may be predetermined, wherein each predetermined pressure range is associated with a respective sensitivity. Thus, at 1124, the control unit may determine into which predetermined pressure range the pressure falls.

At 1126, the control unit may adjust the sensitivity configuration state of the mouse device to a predetermined sensitivity configuration state associated with the identified pressure range, e.g., adjusting the sensitivity of the mouse device to a value associated with the identified pressure range.

It should be appreciated that the above processes of adjusting the sensitivity configuration state of the mouse device illustrated in FIG. 11 are merely exemplary, and the sensitivity configuration state may also be adjusted based on pressure in any other ways. Moreover, the processes 1100, 1110 and 1120 in FIG. 11 may be performed independently or in conjunction with each other.

Figure 12:
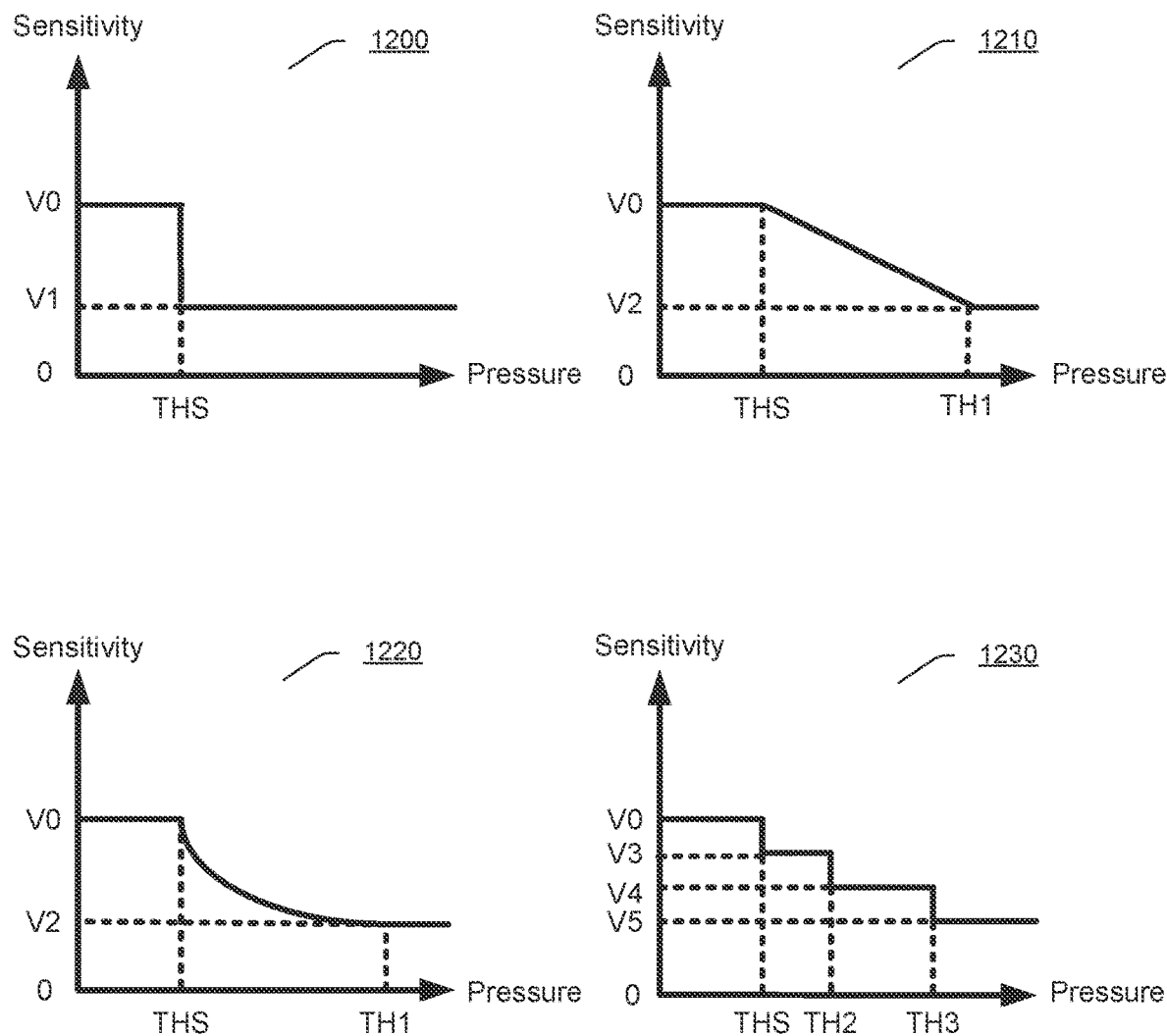
FIG. 12 illustrates exemplary curve graphs of sensitivity adjustment according to embodiments of the present disclosure.

FIG. 12 illustrates exemplary curve graphs 1200, 1210, 1220 and 1230 of sensitivity adjustment according to embodiments of the present disclosure. In each of the curve graphs 1200, 1210, 1220 and 1230, the x axis indicates pressure between a mouse device and an operation surface, and the y axis indicates sensitivity of the mouse device. The pressure may be detected by a pressure sensor of the mouse device, such as the pressure sensor 910 in FIG. 9. The sensitivity may be measured in terms of CPI or DPI.

The curve graph 1200 can correspond to the process 1100 in FIG. 11. In the curve graph 1200, when the pressure is less than a sensitivity change threshold THS, which may correspond to the sensitivity change threshold THS in FIG. 10, the sensitivity may be at an initial value V0. When the pressure is equal to or greater than the sensitivity change threshold THS, the sensitivity may decrease to a predetermined value V1.

The curve graphs 1210 and 1220 may correspond to a combination of the processes 1100 and 1110 in FIG. 11. In the curve graphs 1210 and 1220, when the pressure is less than a sensitivity change threshold THS, which may correspond to the sensitivity change threshold THS in FIG. 10, the sensitivity may be at an initial value V0. When the pressure is equal to or greater than the sensitivity change threshold THS and less than a threshold TH1, wherein TH1>THS, the sensitivity may be adjusted in proportional with the pressure. For example, the sensitivity may be adjusted linearly with the pressure, as indicated in the curve graph 1210, or the sensitivity may be adjusted non-linearly with the pressure, as indicated in the curve graph 1220. When the pressure is equal to or greater than the threshold TH1, the sensitivity may be at a predetermined value V2.

The curve graph 1230 may correspond to the process 1120 in FIG. 11. In the curve graph 1230, when the pressure is less than a sensitivity change threshold THS, which may correspond to the sensitivity change threshold THS in FIG. 10, i.e., the pressure is in a pressure range from 0 to THS, the sensitivity may be at an initial value V0. When the pressure is equal to or greater than the sensitivity change threshold THS and less than a threshold TH2, i.e., the pressure is in a pressure range from THS to TH2, the sensitivity may decrease to a predetermined value V3. When the pressure is equal to or greater than the threshold TH2 and less than a threshold TH3, i.e., the pressure is in a pressure range from TH2 to TH3, the sensitivity may be at a predetermined value V4. When the pressure is equal to or greater than the threshold TH3, i.e., the pressure is in a pressure range that is not less than TH3, the sensitivity may be at a predetermined value V5.

It should be appreciated that although the curve graph 1230 merely illustrates four pressure ranges, the embodiments of the present disclosure may also adopt any other number of pressure ranges and respective sensitivities.

In the curve graphs 1200, 1210, 1220 and 1230, the sensitivity may be kept at a stable value when the pressure is equal to or greater than a maximum threshold. For example, in the curve graph 1210, the sensitivity is kept at the stable value V2 when the pressure is equal to or greater than the threshold TH1. However, alternatively, the sensitivity may also decrease to zero when the pressure is equal to or greater than the maximum threshold. Sensitivity of zero value means that the cursor on the screen would not move any more no matter how the mouse device moves. Sometimes, the sensitivity of zero value may be desirable. For example, in a shooting game, after the target has been targeted, it may be expected that the cursor no longer moves along with any movement of the mouse device, thus achieving locking of the target.

In FIG. 12, the sensitivity may decrease as the pressure increases. While in some scenarios, such as moving the cursor in a large display area, it may be desirable that the sensitivity increases as the pressure increases.

Figure 13:
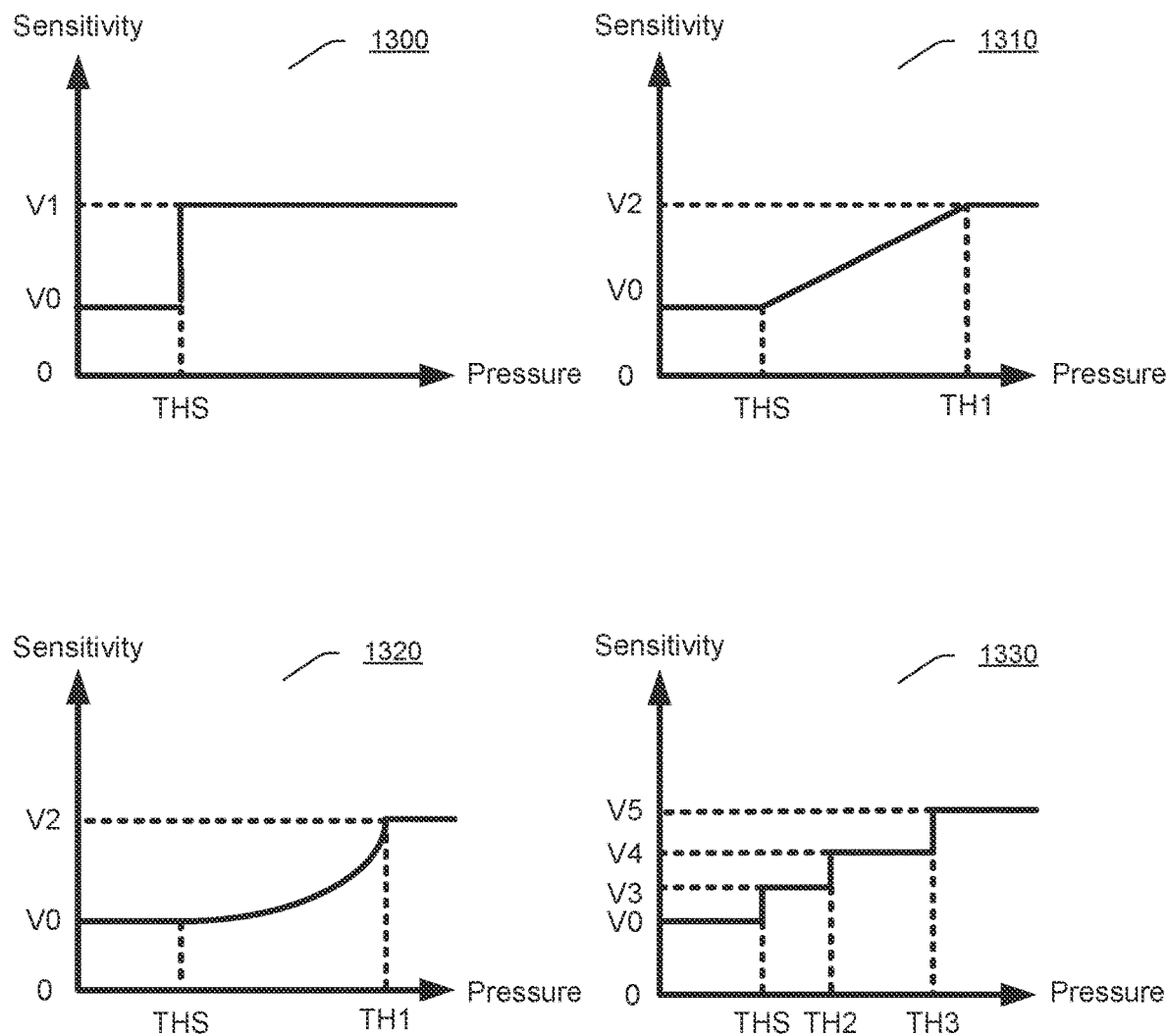
FIG. 13 illustrates exemplary curve graphs of sensitivity adjustment according to embodiments of the present disclosure.

FIG. 13 illustrates exemplary curve graphs 1300, 1310, 1320 and 1330 of sensitivity adjustment according to embodiments of the present disclosure. The curve graphs 1300, 1310, 1320 and 1330 are similar with the curve graphs 1200, 1210, 1220 and 1230, respectively, except that in the curve graphs 1300, 1310, 1320 and 1330, the sensitivity may increase when the pressure reaches respective thresholds.

In an implementation, the mouse device may comprise a plurality of pressure sensors. The plurality of pressure sensors can be assigned to different functions. For example, a pressure sensor at the head part of the bottom of the mouse device may be assigned to detect the hover state, a pressure sensor at the tail part may be assigned to decrease the sensitivity, a pressure sensor at the right part may be assigned to increase the sensitivity, etc. Moreover, a pressure sensor may also be assigned for performing a function that is specific to an application. For example, a pressure sensor may be assigned to reload bullets in a shooting game.

The foregoing describes utilizing pressure detection to configure operating states of a mouse device, including such as a hover state or a non-hover state, a sensitivity configuration state, etc. More specifically, an operating state may be determined by comparing a detected pressure to a threshold or identifying a pressure range into which the detected pressure falls. The threshold or the pressure range and its associated operating state can be automatically set by the mouse device or set through a software module in a host computer communicated with the mouse device.

Figure 14:
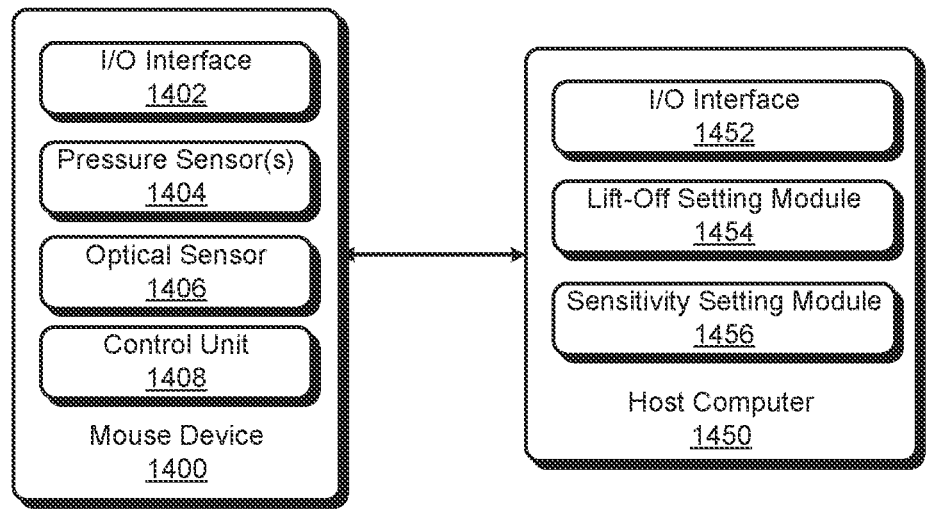
FIG. 14 illustrates an exemplary mouse device communicating with a host computer according to an embodiment of the present disclosure.

FIG. 14 illustrates an exemplary mouse device 1400 communicating with a host computer 1450 according to an embodiment of the present disclosure.

The mouse device 1400 may comprise an I/O interface 1402, at least one pressure sensor 1404, an optical sensor 1406 and a control unit 1408, which may correspond to the I/O interface 502, the at least one pressure sensor 504, the optical sensor 506 and the control unit 508 in FIG. 5, respectively.

The host computer 1450 may comprise an I/O interface 1452, a lift-off setting module 1454 and a sensitivity setting module 1456. The I/O interface 1402 may be configured to communicate with the mouse device 1400, such as sending setting commands to the mouse device 1400, receiving data from the mouse device 1400, and the like. The lift-off setting module 1454 may be configured to perform lift-off setting of the mouse device 1400, such as setting a lift-off threshold for determining the hover state of the mouse device 1400. The sensitivity setting module 1456 may be configured to perform sensitivity setting of the mouse device 1400, such as setting a sensitivity change threshold or pressure ranges and associated sensitivity configuration states of the mouse device 1400.

It should be appreciated that the mouse device 1400 and the host computer 1450 illustrated in FIG. 14 are merely exemplary. Depending on the actual application requirements, the mouse device 1400 and the host computer 1450 may have any other structure and may include more or fewer elements. Moreover, some functions implemented by the control unit 1408 may also be implemented by the host computer, and some functions implemented by the lift-off setting module 1454 or the sensitivity setting module 1456 may also be implemented by the control unit 1408.

Figure 15:
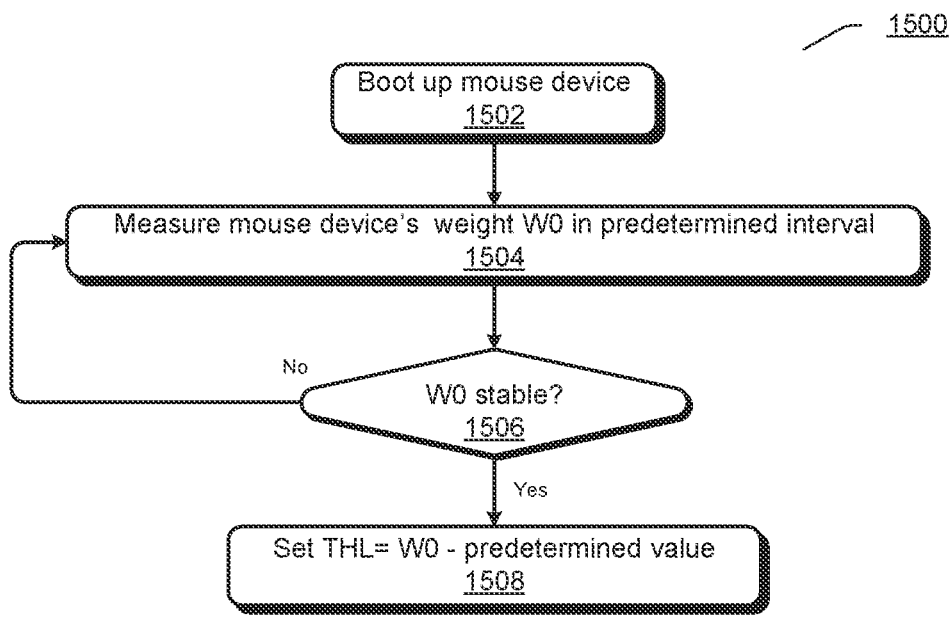
FIG. 15 illustrates an exemplary process of automatically setting a lift-off threshold THL of a mouse device according to an embodiment of the present disclosure.

FIG. 15 illustrates an exemplary process 1500 of automatically setting a lift-off threshold THL of a mouse device according to an embodiment of the present disclosure. The lift-off threshold THL can correspond to the lift-off threshold THL in FIG. 4. The process 1500 can be automatically performed after the mouse device is booted-up at 1502.

At 1504, the mouse device's weight W0 may be measured in a predetermined interval, such as several seconds.

At 1506, it may be determined whether the mouse device's weight W0 is stable or not. This step intends to determine whether the measured W0 is the mouse device's real weight. For example, if the mouse device is touched by a user or moves on a table, the measured W0 may be not stable and greater than the mouse device's real weight.

If it is determined at 1506 that the measured W0 is stable, that is, the measured W0 is the mouse device's real weight, the lift-off threshold THL may be set as being equal to the measured W0 minus a predetermined value, such as 20 g, at 1508.

If it is determined at 1506 that the measured W0 is not stable, that is, the measured W0 is not the mouse device's real weight, the process 1500 may return to the step 1504.

Figure 16:
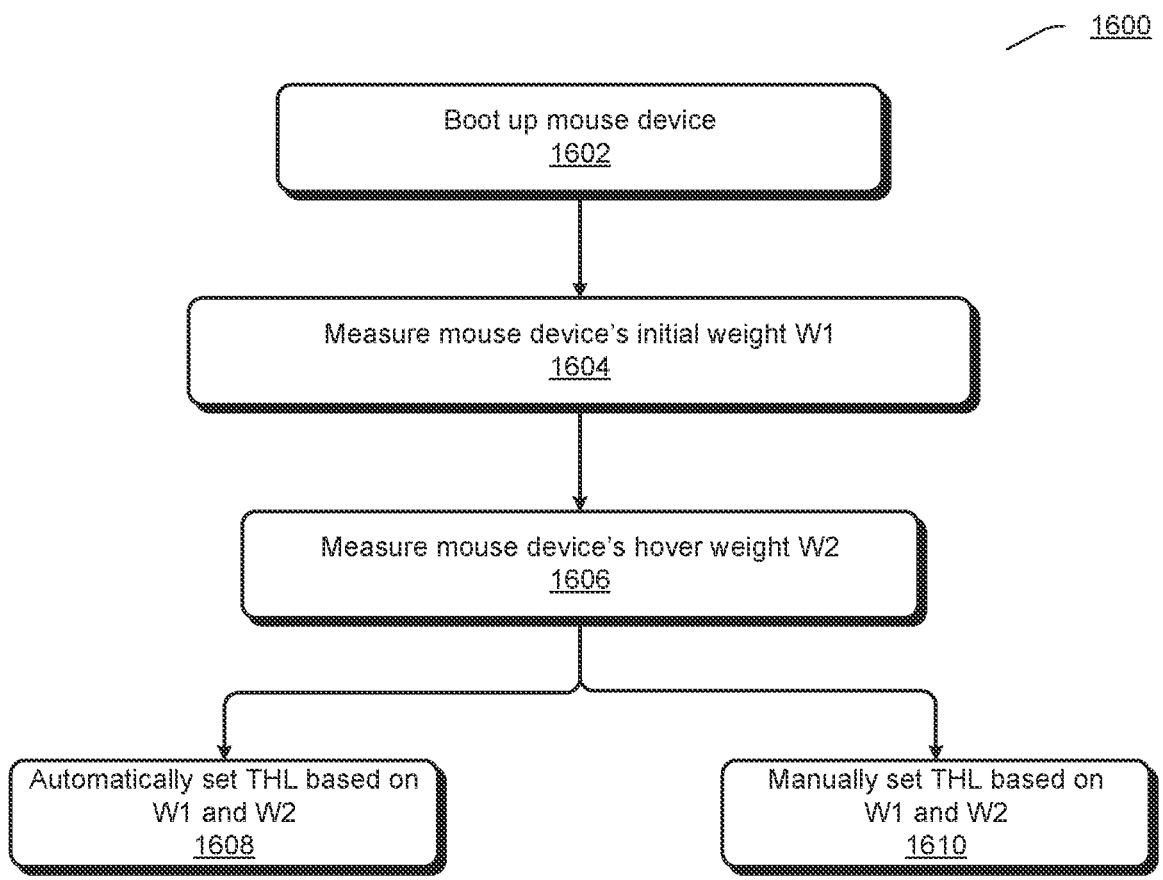
FIG. 16 illustrates an exemplary process of setting a lift-off threshold THL of a mouse device through a software module according to an embodiment of the present disclosure.

The lift-off threshold THL of the mouse device can also be set through a software module in a host computer communicated with the mouse device. FIG. 16 illustrates an exemplary process 1600 of setting a lift-off threshold THL of a mouse device through a software module of a host computer, such as the lift-off setting module 1454 in FIG. 14, according to an embodiment of the present disclosure.

At 1602, the mouse device may be booted-up.

At 1604, the mouse device's initial weight W1 may be measured. Herein, the initial weight W1 may be referred to as a weight measured when the mouse device is placed on an operation surface and untouched by the user's hand.

At 1606, the mouse device's hover weight W2 may be measured. Herein, the hover weight W2 may be referred to as a weight measured after the mouse device is lifted off from the operation surface.

At 1608, the lift-off threshold THL may be automatically set based on the initial weight W1 and the hover weight W2. For example, the lift-off threshold THL may be set to any value between the initial weight W1 and the hover weight W2, such as THL=(W1−W2)/2.

Alternatively, at 1610, the lift-off threshold THL may be manually set based on the initial weight W1 and the hover weight W2. For example, the lift-off threshold THL may be set between the initial weight W1 and the hover weight W2 by the user.

In the process 1500 illustrated in FIG. 15 and the process 1600 illustrated in FIG. 16, the lift-off threshold THL may be defined based on attributes of the mouse device, such as the mouse device's initial weight W1 and hover weight W2.

Alternatively or additionally, the lift-off threshold THL may be defined based on user settings. For example, the user may manually set the lift-off threshold THL between the initial weight W1 and the hover weight W2.

Figure 17A:
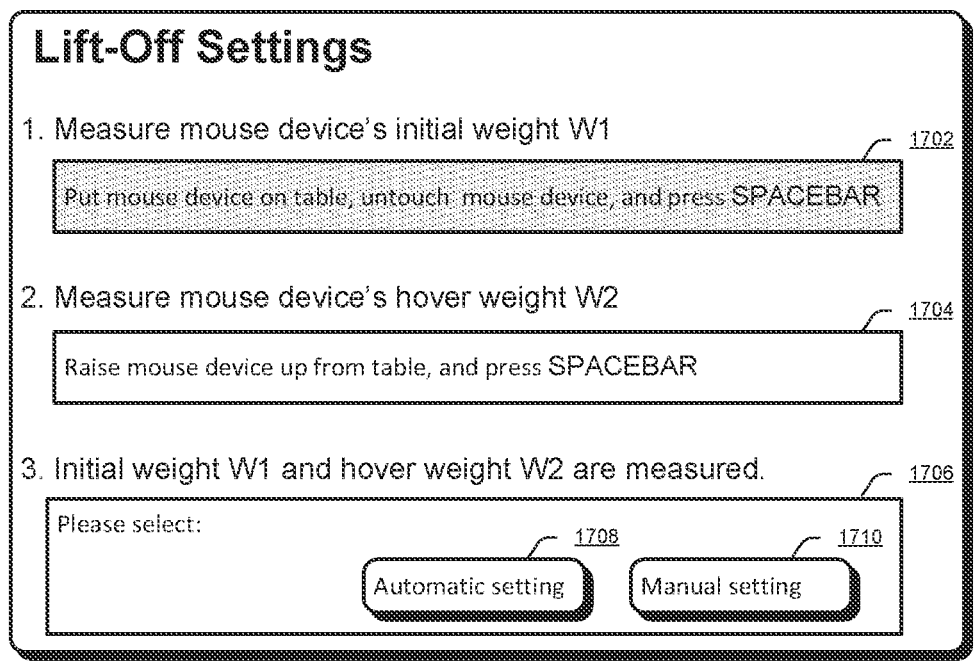
FIG. 17A and FIG. 17B illustrate exemplary Graphical User Interfaces (GUIs) for guiding a user to set a lift-off threshold THL according to an embodiment of the present disclosure.
Figure 17B:
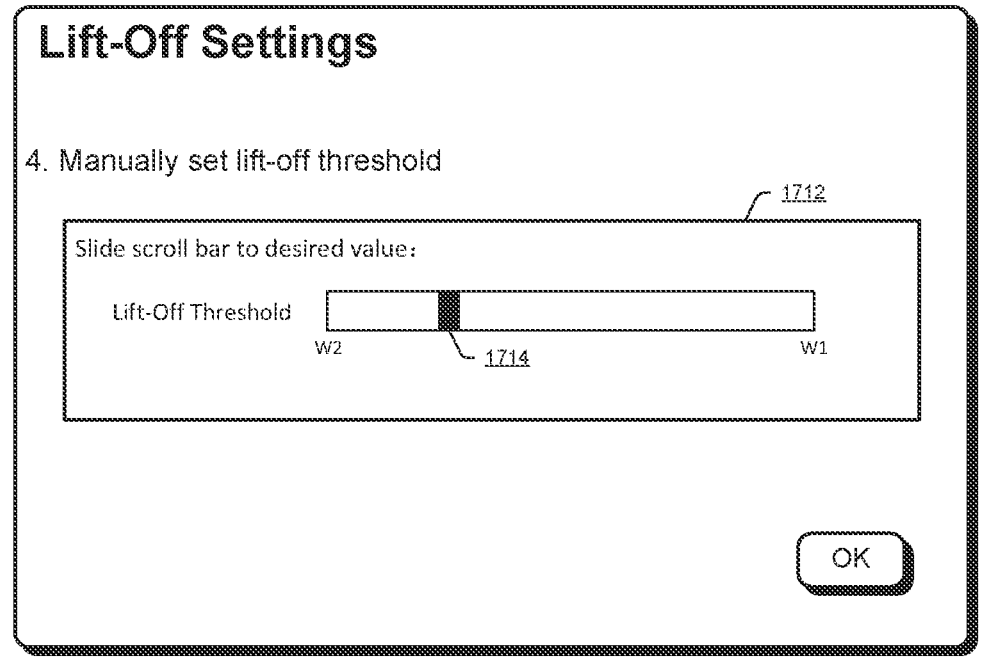

In an implementation, the host computer can provide Graphical User Interfaces (GUIs) on a display screen to guide the user to set the lift-off threshold THL. FIG. 17A and FIG. 17B illustrate exemplary GUIs 1700a and 1700b for guiding the user to set the lift-off threshold THL according to an embodiment of the present disclosure. In an implementation, the GUIs 1700a and 1700b may be provided by the lift-off setting module 1454 in FIG. 14.

The GUI 1700a shows steps for setting the lift-off threshold THL. These steps may require user interaction, which can be highlighted accordingly. For example, a first step is measuring the mouse device's initial weight W1. The initial weight W1 should be measured when the mouse device is placed on an operation surface and untouched by the user's hand. Thus, a box 1702 may be highlighted to prompt the user to put the mouse device on the table, untouch the mouse device, and press a spacebar on a keyboard to perform the measurement. Next, the box 1702 may de unhighlighted, and a box 1704 may be highlighted to prompt the user to raise the mouse device up from the table, and press the spacebar, so as to measure the mouse device's hover weight W2. When the initial weight W1 and the hover weight W2 are measured, the box 1704 may be unhighlighted, and a box 1706 may be highlighted to prompt the user to select automatic setting 1708 or manual setting 1710 of the lift-off threshold THL.

If the user selects automatic setting 1708, the lift-off threshold THL may be automatically set based on the initial weight W1 and the hover weight W2, such as THL=(W1−W2)/2. In order to notify the user that the lift-off threshold THL is set completely, a notification, such as "The lift-off threshold has been set successfully!" (not shown), may be displayed on the screen.

If the user selects the manual setting 1710, the GUI 1700b may be displayed on the screen. The GUI 1700b may comprise a box 1712 in which the initial weight W1 and the hover weight W2 are indicated. The user may slide a scroll bar 1714 to a desired value of the lift-off threshold THL.

Sensitivity settings of the mouse device, including the sensitivity change threshold THS or pressure ranges and associated sensitivity configuration states, can also be set through the software module in the host computer. The sensitivity settings may comprise basic settings or advanced settings. Through the basic settings, a sensitivity change threshold THS of the mouse device, such as the sensitivity change threshold THS in FIG. 10, may be set. Through the advanced settings, a curve graph of sensitivity adjustment, such as the curve graphs 1200, 1210, 1220 and 1230 in FIG. 12 and the curve graphs 1300, 1310, 1320 and 1330 in FIG. 13, may be determined.

Figure 18:
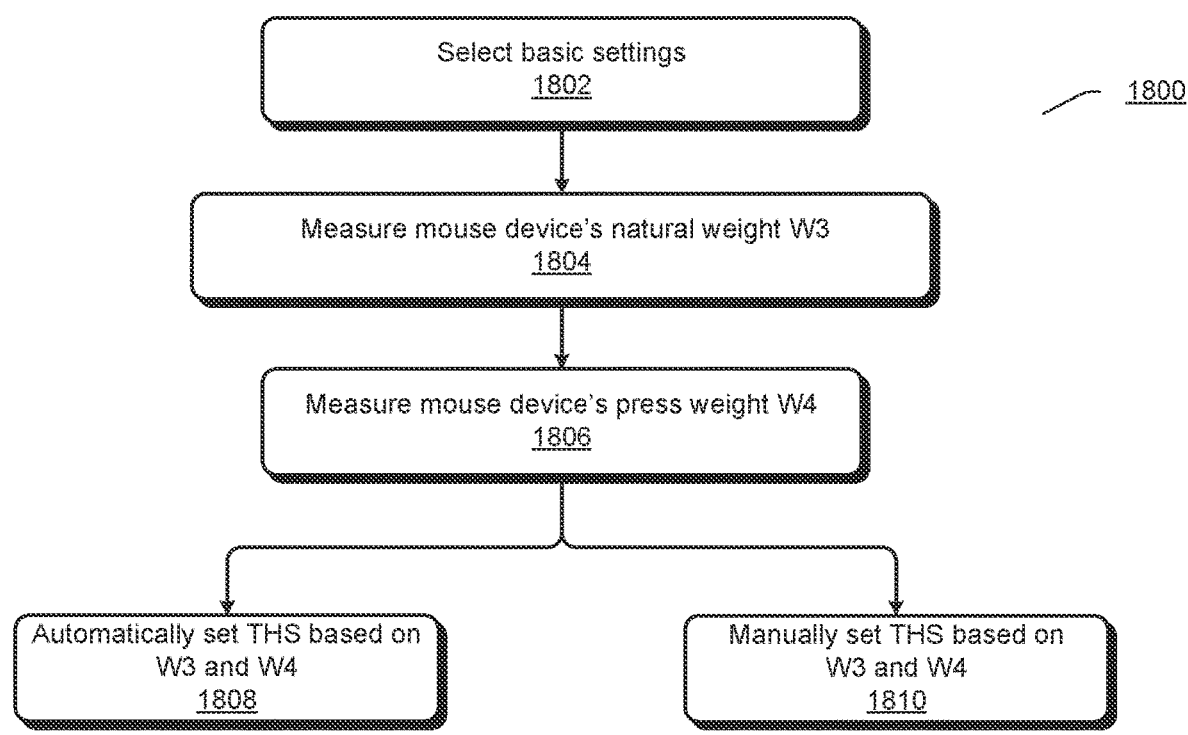
FIG. 18 illustrates an exemplary process for setting a sensitivity change threshold THS according to an embodiment of the present disclosure.

FIG. 18 illustrates an exemplary process 1800 for setting a sensitivity change threshold THS according to an embodiment of the present disclosure. The process 1800 may be executed through the sensitivity setting module 1456 in FIG. 14.

At 1802, the basic settings may be selected. For example, the display screen of the host computer may display two options, "basic settings" and "advanced settings", for the user to select.

At 1804, the mouse device's natural weight W3 may be measured. Herein, the natural weight W3 may refer to a weight measured when the mouse device moves normally on the operation surface.

At 1806, the mouse device's press weight W4 may be measured. Herein, the press weight W4 may refer to a weight measured when the body of the mouse device is pressed. In an implementation, in the actual measurement of the press weight W4, a target can be displayed on the screen and the user may be guided to aim at the target with the mouse device. Through guiding the user to aim at the target, the user's usage habits may be considered during the measurement of the press weight W4.

At 1808, the sensitivity change threshold THS may be automatically set based on the natural weight W3 and the press weight W4. For example, the sensitivity change threshold THS may be set to any value between the natural weight W3 and the press weight W4, such as THS=(W4+W3)/2.

Alternatively, at 1810, the sensitivity change threshold THS may be manually set based on the natural weight W3 and the press weight W4. For example, the sensitivity change threshold THS may be set between the natural weight W3 and the press weight W4 by the user.

In the process 1800 illustrated in FIG. 18, the sensitivity change threshold THS may be defined based on attributes of the mouse device, such as the mouse device's natural weight W3. Alternatively or additionally, the sensitivity change threshold THS may be defined based on user settings. For example, the user may manually set the sensitivity change threshold THS between the natural weight W3 and the press weight W4. Moreover, the sensitivity change threshold THS may be defined based on usage habits. For example, the mouse device's press weight W4 used to set the sensitivity change threshold THS may be measured when the user is really aiming at the target.

Figure 19A:
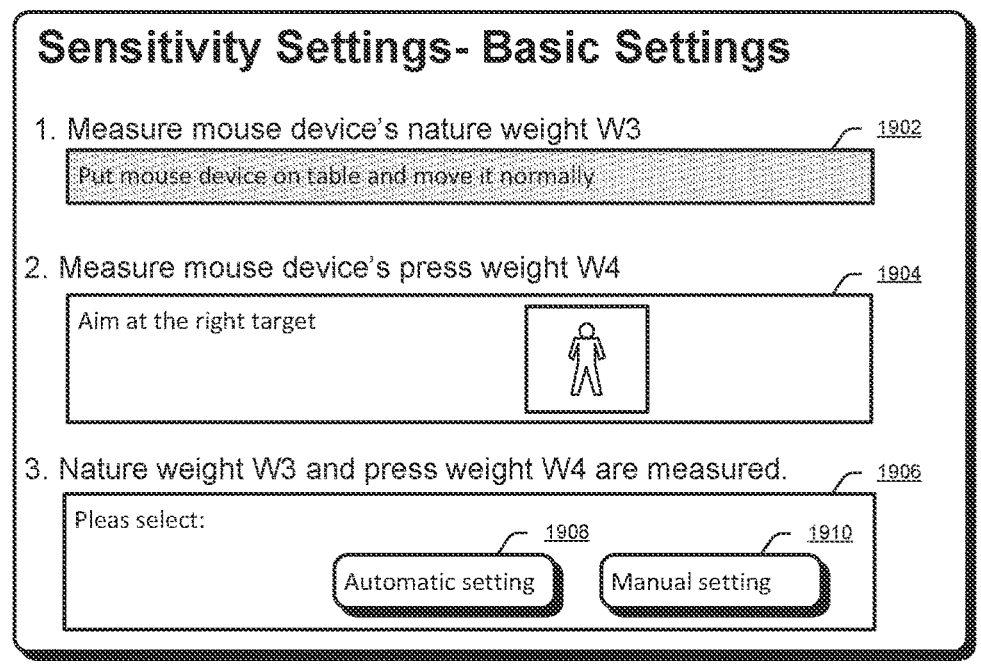
FIG. 19A and FIG. 19B illustrate exemplary GUIs for guiding a user to set a sensitivity change threshold THS according to an embodiment of the present disclosure.
Figure 19B:
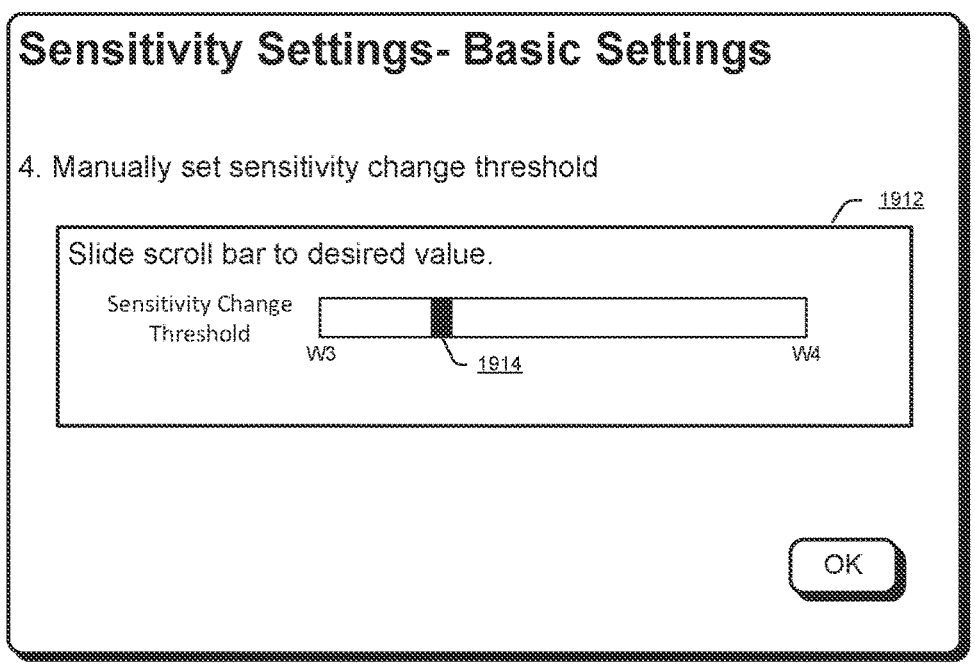

In an implementation, the host computer can provide GUIs on the screen to guide the user to set the sensitivity change threshold THS. FIG. 19A and FIG. 19B illustrate exemplary GUIs 1900a and 1900b for guiding the user to set the sensitivity change threshold THS according to an embodiment of the present disclosure. In an implementation, the GUIs 1900a and 1900b may be provided by the sensitivity setting module 1456 in FIG. 14.

The GUI 1900a shows steps for setting the sensitivity change threshold THS. These steps may require user interaction, which can be highlighted accordingly. For example, a first step is measuring the mouse device's natural weight W3. The natural weight W3 should be measured when the mouse device is put on an operation surface and moves normally. Thus, a box 1902 may be highlighted to prompt the user to put the mouse device on the table and move it normally. Meanwhile, the mouse device's weight may be measured in a predetermined interval, such as several seconds. In an embodiment, the natural weight W3 may be the average of the weights measured during this period.

Once the natural weight W3 is obtained, the box 1902 may de unhighlighted, and a box 1904 may be highlighted to prompt the user to use the mouse device to aim at a target displayed on the screen. Meanwhile, the mouse device's weight may be measured in a predetermined interval, such as several seconds, to obtain the mouse device's press weight W4. In an embodiment, the press weight W4 may be the average of the weights measured during this period. It should be appreciated that although the box 1904 shows one target, the box 1904 may shows more than one targets for the user to aim at, and thus more user usage habits may be obtained.

Once the press weight W4 is obtained, the box 1904 may be unhighlighted, and a box 1906 may be highlighted to prompt the user to select automatic setting 1908 or manual setting 1910 of the sensitivity change threshold THS.

If the user selects the automatic setting 1908, the sensitivity change threshold THS may be automatically set based on the natural weight W3 and the press weight W4, such as THS=(W4-W3)/2. In order to notify the user that the sensitivity change threshold THS is set completely, a notification, such as "The sensitivity change threshold has been set successfully!" (not shown), may be displayed on the screen.

If the user selects the manual setting 1910, the GUI 1900*b* may be displayed on the screen. The GUI 1900*b* may comprise a box 1912 in which the natural weight W3 and the press weight W4 are indicated. The user may slide a scroll bar 1914 to a desired value of the sensitivity change threshold THS.

Figure 20:
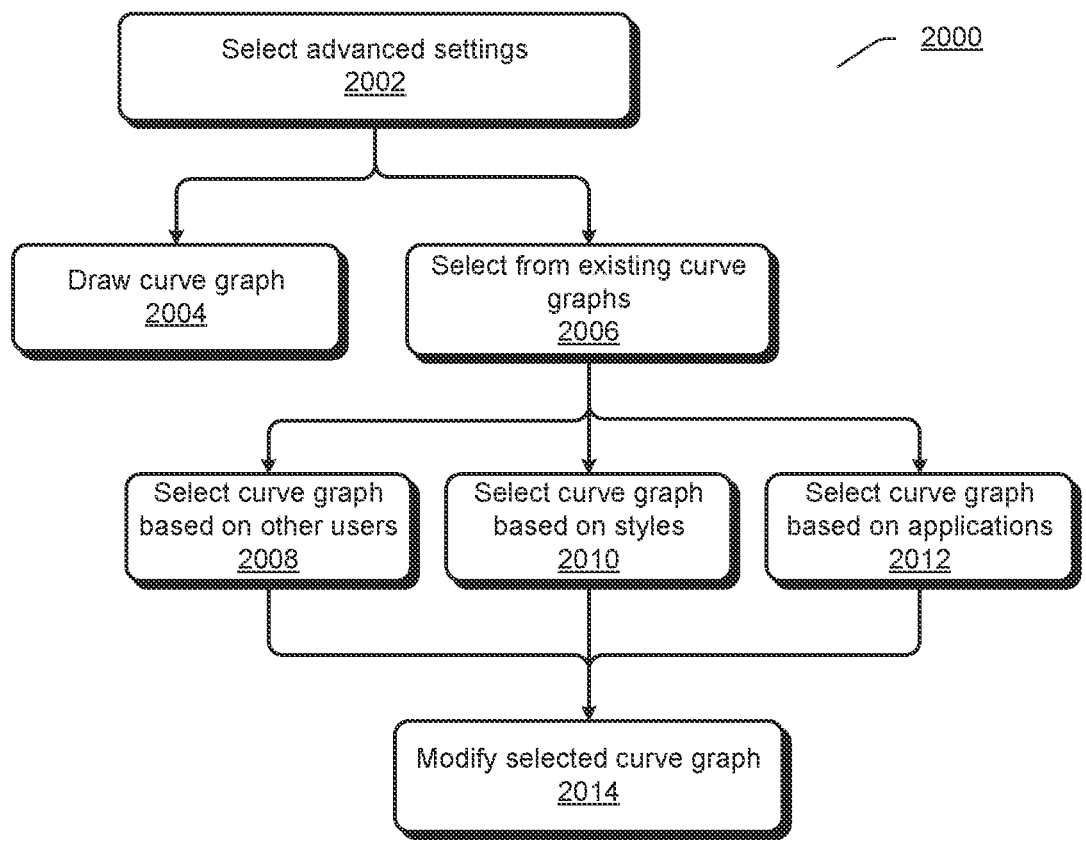
FIG. 20 illustrates an exemplary process for determining a curve graph of sensitivity adjustment according to an embodiment of the present disclosure.

FIG. 20 illustrates an exemplary process 2000 for determining a curve graph of sensitivity adjustment according to an embodiment of the present disclosure. The process 2000 may be executed through the sensitivity setting module 1456 in FIG. 14.

At 2002, the advanced settings may be selected. For example, the display screen of the host computer may display two options, "basic settings" and "advanced settings", for the user to choose.

Next, the user may choose to draw a curve graph of sensitivity adjustment at 2004 or select a curve graph from existing curve graphs of sensitivity adjustment at 2006.

Figure 21:
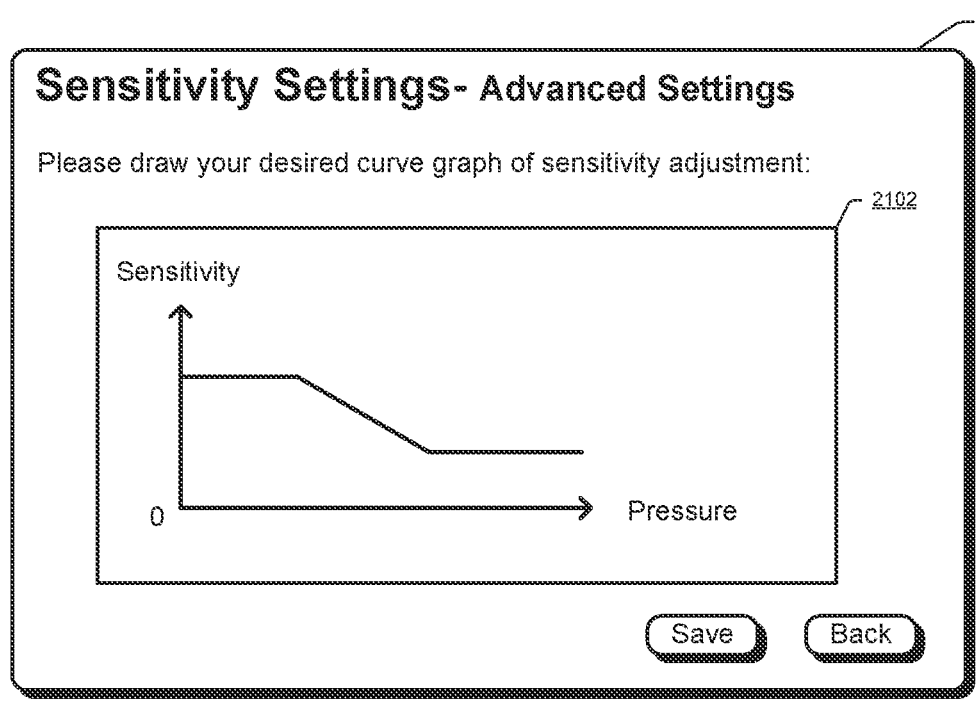
FIG. 21 illustrates an exemplary GUI for drawing a curve graph of sensitivity adjustment according to an embodiment of the present disclosure.

If the user chooses to draw a curve graph of sensitivity adjustment at 2004, a GUI, such as a GUI 2100 in FIG. 21 may be displayed on the screen. The GUI 2100 may comprise a drawing area 2102 in which the user may draw a desired curve graph of sensitivity adjustment using the mouse device and/or the keyboard.

If the user chooses to select a curve graph from existing curve graphs of sensitivity adjustment at 2006, the user may further choose to select a curve graph based on other users at 2008, select a curve graph based on styles at 2010 or select a curve graph based on applications at 2012.

Figure 22:
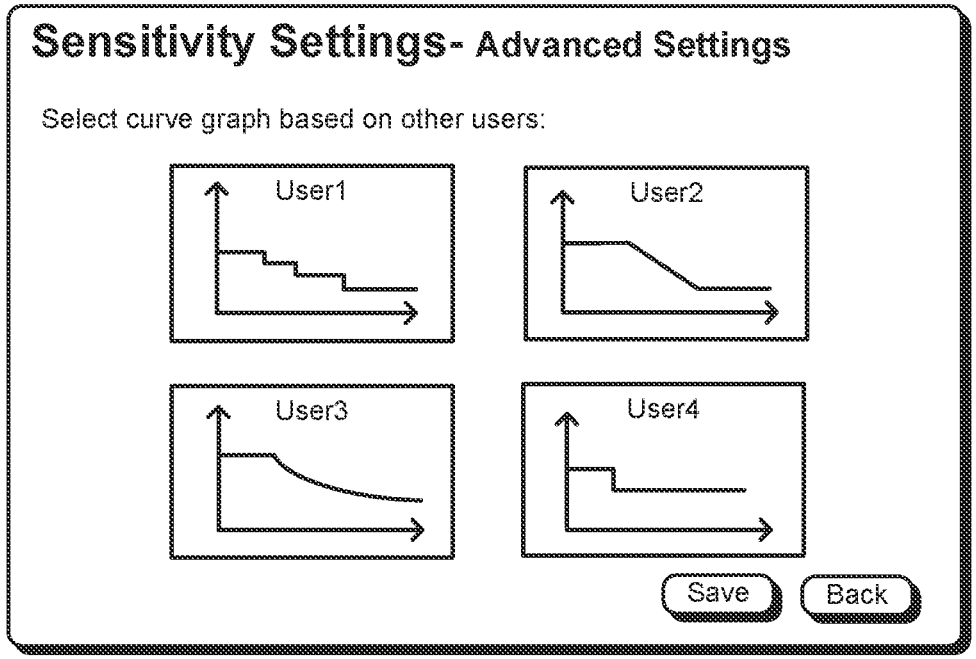
FIG. 22 illustrates an exemplary GUI for selecting a curve graph of sensitivity adjustment according to an embodiment of the present disclosure.

If the user chooses to select a curve graph based on other users at 2008, the screen may display curve graphs of other users for the user to select, as shown in a GUI 2200 in FIG. 22. For example, the screen may display curve graphs of famous game players.

If the user chooses to select a curve graph based on styles at 2010, the screen may display curve graphs suitable for different mouse device usage styles for the user to select. The different mouse device usage styles may include hard pushing, gentle handling, and the like.

If the user chooses to select a curve graph based on applications at 2012, the screen may display curve graphs suitable for different applications for the user to select. In an implementation, the curve graph may be automatically changed based on a currently running application.

Figure 23:
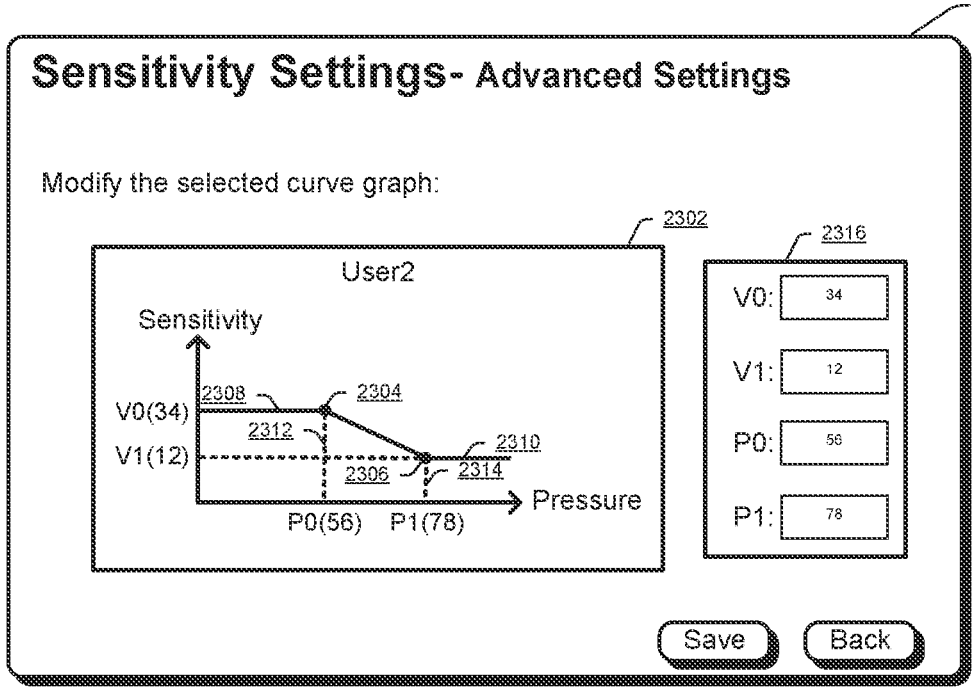
FIG. 23 illustrates an exemplary GUI for modifying a selected curve graph according to an embodiment of the present invention.

When the user has selected a curve graph, the user may modify the selected curve graph at 2014. FIG. 23 illustrates an exemplary GUI 2300 of modifying a selected curve graph according to an embodiment of the present invention. The selected curve graph may be displayed in a box 2302. In an embodiment, the user may directly drag some points of the curve graph, e.g., points 2304 or 2306, using the mouse device. In another embodiment, the user may drag some lines of the curve graph using the mouse device. For example, the user may drag solid lines 2308 or 2310 up and down, or drag dotted lines 2312 or 2314 left and right. In yet another embodiment, the user may enter desired values for parameters in 2302, e.g., V0, V1, P0 or P1, in a box 2316. The user may modify the curve graph through any of the above operations. When some items are changed, related points, lines and values may be changed accordingly in real time. For example, if the user drags the solid line 2308 up, the value for V0 in the box 2316 will increase accordingly.

Invalid operations on the curve graph may be prevented, and a corresponding error message may be shown on the screen. For example, the points or the lines may not be dragged beyond a predetermined valid area, and the entered values may not exceed a predetermined valid range. Moreover, operations which cause P1 to be less than P0, such as dragging the point 2306 to be the left of the point 2304 or dragging the dotted line 2314 to be the left of the dotted line 2312, may be prevented. Similarly, in a normal aiming operation, operations which cause V1 to be greater than V0, such as dragging the point 2306 to the top of the point 2304 or dragging the dotted line 2314 to be the top of the dotted line 2312, may also be prevented. It is noted that in some scenarios, such as pressing to high-speed movement, the operations causing V1 to be greater than V0 may be allowed.

In the process 2000 illustrated in FIG. 20 and the GUIs 2100-2300 illustrated in FIGS. 21-23, the curve graph of sensitivity adjustment may be defined based on running applications. For example, the curve graph may be changed based on the currently running application. Alternatively or additionally, the curve graph of sensitivity adjustment may be defined based on user settings. For example, the user may select the curve graph from the existing curve graphs of sensitivity adjustment and modify the selected curve graph.

The foregoing describes, in connection with FIGS. 16-23, the processes and associated GUIs for setting thresholds of the mouse device, such as the lift-off threshold THL and the sensitivity change threshold THS, and determining a curve graph of sensitivity adjustment through the software modules in the host computer communicated with the mouse device. It should be appreciated that the processes and GUIs illustrated in FIGS. 16-23 are merely exemplary. Depending on the actual application requirements, the embodiments of the present disclosure may also adopt any other processes and GUIs.

Figure 24:
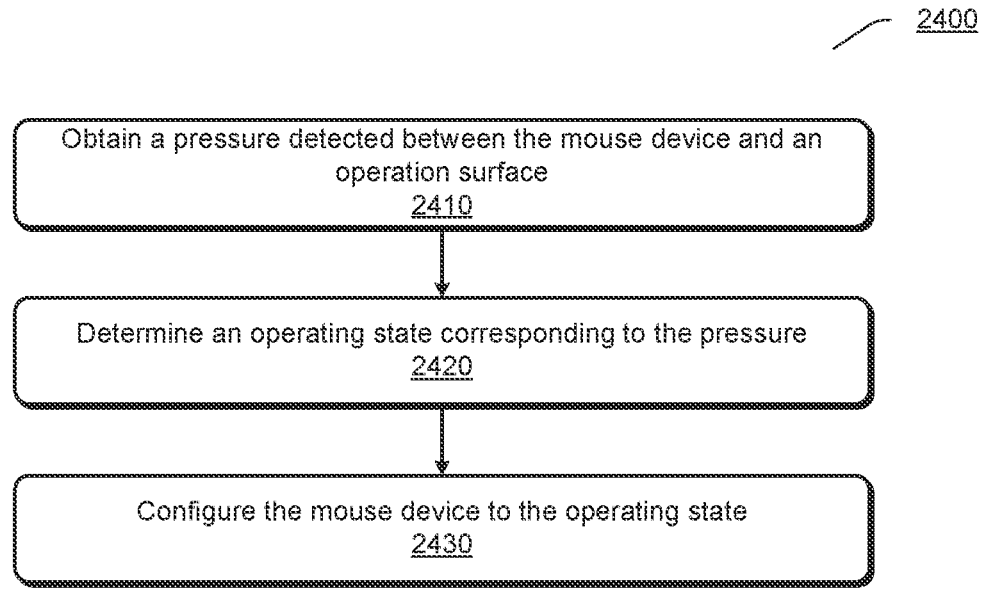
FIG. 24 illustrates a flowchart of an exemplary method for configuring a mouse device through pressure detection according to an embodiment.

FIG. 24 illustrates a flowchart of an exemplary method 2400 for configuring a mouse device through pressure detection according to an embodiment.

At 2410, pressure detected between the mouse device and an operation surface may be obtained.

At 2420, an operating state corresponding to the pressure may be determined.

At 2430, the mouse device may be configured to the operating state.

In an implementation, the operating state may comprise a hover state or a non-hover state, the mouse device being disabled in the hover state and being enabled in the non-hover state.

The determining may comprise: comparing the pressure with a threshold; determining the operating state as the hover state if the pressure is less than the threshold; and determining the operating state as the non-hover state if the pressure is equal to or greater than the threshold.

The threshold may be less than the weight of the mouse device.

In an implementation, the operating state may comprise a sensitivity configuration state, the sensitivity configuration state having a corresponding sensitivity.

The determining may comprise: comparing the pressure with a threshold; determining the operating state as a first sensitivity configuration state if the pressure is less than the threshold; and determining the operating state as a second sensitivity configuration state if the pressure is equal to or greater than the threshold, the first sensitivity configuration state and the second sensitivity configuration state having different sensitivities.

The sensitivity may be proportional with the pressure if the pressure is equal to or greater than the threshold.

The threshold may be greater than the weight of the mouse device, or is above a normal pressure range for operating the mouse device on the operation surface.

The determining may comprise: identifying, from a plurality of predetermined pressure ranges, a pressure range into which the pressure falls, the plurality of predetermined pressure ranges being associated with respective sensitivity configuration states; and determining the operating state as a sensitivity configuration state associated with the identified pressure range.

In an implementation, the determining may comprise: determining the operating state through comparing the pressure with a state change criterion.

The state change criterion may be defined based on at least one of: attributes of the mouse device, running applications, user settings, and usage habits.

It should be appreciated that the method 2400 may further comprise any steps/processes for configuring a mouse device through pressure detection according to the embodiments of the present disclosure as mentioned above.

Figure 25:
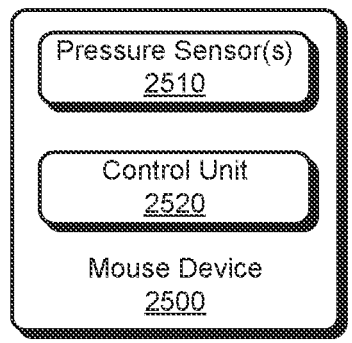
FIG. 25 illustrates an exemplary mouse device according to an embodiment.

FIG. 25 illustrates an exemplary mouse device 2500 according to an embodiment.

The mouse device 2500 may comprise: one or more pressure sensors 2510 located at the bottom of the mouse device, for detecting one or more pressures between the mouse device and an operation surface; and a control unit 2520, for determining at least one operating state based on the one or more pressures, and configuring the mouse device to the at least one operating state.

In an implementation, the control unit 2520 may be configured for: determining the at least one operating state based on at least one pressure among the one or more pressures.

The at least one operating state comprises different types of operating state

Moreover, the mouse device 2500 may also comprise any other modules according to the embodiments of the present disclosure as mentioned above.

Figure 26:
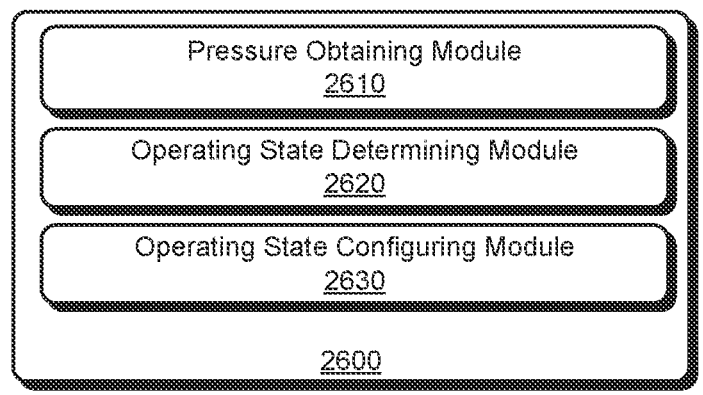
FIG. 26 illustrates an exemplary apparatus for configuring a mouse device through pressure detection according to an embodiment.

FIG. 26 illustrates an exemplary apparatus 2600 for configuring a mouse device through pressure detection according to an embodiment.

The apparatus 2600 may comprise: a pressure obtaining module 2610, for obtaining pressure detected between the mouse device and an operation surface; an operating state determining module 2620, for determining an operating state corresponding to the pressure; and an operating state configuring module 2630, for configuring the mouse device to the operating state.

In an implementation, the operating state may comprise a hover state or a non-hover state, the mouse device being disabled in the hover state and being enabled in the non-hover state.

The operating state determining module 2620 may be further configured for: comparing the pressure with a threshold; determining the operating state as the hover state if the pressure is less than the threshold; and determining the operating state as the non-hover state if the pressure is equal to or greater than the threshold.

In an implementation, the operating state may comprise a sensitivity configuration state, the sensitivity configuration state having a corresponding sensitivity.

The operating state determining module 2620 may be further configured for: comparing the pressure with a threshold; determining the operating state as a first sensitivity configuration state if the pressure is less than the threshold; and determining the operating state as a second sensitivity configuration state if the pressure is equal to or greater than the threshold, the first sensitivity configuration state and the second sensitivity configuration state having different sensitivities.

Moreover, the apparatus 2600 may further comprise any modules for performing steps of the methods for configuring a mouse device through pressure detection according to the embodiments of the present disclosure as mentioned above.

Figure 27:
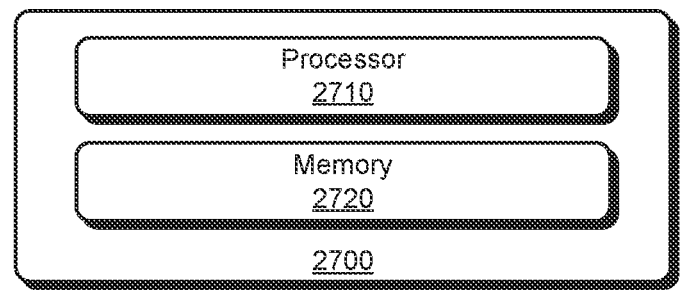
FIG. 27 illustrates an exemplary apparatus for configuring a mouse device through pressure detection according to an embodiment.

FIG. 27 illustrates an exemplary apparatus 2700 for configuring a mouse device through pressure detection according to an embodiment.

The apparatus 2700 may comprise at least one processor 2710 and a memory 2720 storing computer-executable instructions. When executing the computer-executable instructions, the at least one processor 2710 may perform any operations of the methods for configuring a mouse device through pressure detection according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for configuring a mouse device through pressure detection according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

What is claimed is:

1. A method for configuring a mouse device through pressure detection, comprising:
   obtaining pressure detected between the mouse device and an operation surface;
   determining an operating state corresponding to the pressure; and
   configuring the mouse device to the operating state, wherein the operating state comprises a hover state or a non-hover state, the mouse device being disabled in the hover state and being enabled in the non-hover state.

2. The method of claim 1, wherein the determining comprises:
   comparing the pressure with a threshold;
   determining the operating state as the hover state if the pressure is less than the threshold; and
   determining the operating state as the non-hover state if the pressure is equal to or greater than the threshold.

3. The method of claim 2, wherein the threshold is less than the weight of the mouse device.

4. The method of claim 1, wherein the operating state comprises a sensitivity configuration state, the sensitivity configuration state having a corresponding sensitivity.

5. The method of claim 4, wherein the determining comprises:
   comparing the pressure with a threshold;
   determining the operating state as a first sensitivity configuration state if the pressure is less than the threshold; and
   determining the operating state as a second sensitivity configuration state if the pressure is equal to or greater than the threshold, the first sensitivity configuration state and the second sensitivity configuration state having different sensitivities.

6. A method for configuring a mouse device through pressure detection, comprising:
   obtaining pressure detected between the mouse device and an operation surface;
   determining an operating state corresponding to the pressure, wherein the determining comprises comparing the pressure with a threshold; and
   configuring the mouse device to the operating state, wherein the operating state comprises a sensitivity configuration state, the sensitivity configuration state having a corresponding sensitivity, wherein the sensitivity is proportional with the pressure if the pressure is equal to or greater than the threshold.

7. The method of claim 6, wherein the threshold is greater than the weight of the mouse device, or is above a normal pressure range for operating the mouse device on the operation surface.

8. A method for configuring a mouse device through pressure detection, comprising:
   obtaining pressure detected between the mouse device and an operation surface;
   determining an operating state corresponding to the pressure; and
   configuring the mouse device to the operating state, wherein the operating state comprises a sensitivity configuration state, the sensitivity configuration state having a corresponding sensitivity,
   wherein the determining comprises:
   identifying, from a plurality of predetermined pressure ranges, a pressure range into which the pressure falls, the plurality of predetermined pressure ranges being associated with respective sensitivity configuration states; and
   determining the operating state as one of the sensitivity configuration states associated with the identified pressure range.

9. The method of claim 1, wherein the determining comprises:
   determining the operating state through comparing the pressure with a state change criterion.

10. The method of claim 9, wherein the state change criterion is defined based on at least one of: attributes of the mouse device, running applications, user settings, and usage habits.

11. An apparatus for configuring a mouse device through pressure detection, comprising:
   a pressure obtaining module, for obtaining pressure detected between the mouse device and an operation surface;
   an operating state determining module, for determining an operating state corresponding to the pressure; and
   an operating state configuring module, for configuring the mouse device to the operating state, wherein the operating state comprises a hover state or a non-hover state, the mouse device being disabled in the hover state and being enabled in the non-hover state.

* * * * *